United States Patent
Tour et al.

(10) Patent No.: US 10,232,343 B2
(45) Date of Patent: Mar. 19, 2019

(54) HYDRATED POROUS MATERIALS FOR SELECTIVE CO₂ CAPTURE

(71) Applicants: James M. Tour, Bellaire, TX (US); Almaz S. Jalilov, Houston, TX (US)

(72) Inventors: James M. Tour, Bellaire, TX (US); Almaz S. Jalilov, Houston, TX (US)

(73) Assignee: William Marsh Rice University, Houston, TX (US)

(*) Notice: Subject to any disclaimer, the term of this patent is extended or adjusted under 35 U.S.C. 154(b) by 0 days.

(21) Appl. No.: 15/640,765

(22) Filed: Jul. 3, 2017

(65) Prior Publication Data

US 2018/0008957 A1    Jan. 11, 2018

Related U.S. Application Data

(63) Continuation-in-part of application No. PCT/US2016/048430, filed on Aug. 24, 2016.

(60) Provisional application No. 62/209,489, filed on Aug. 25, 2015.

(51) Int. Cl.
| B01D 53/02 | (2006.01) |
| B01J 20/20 | (2006.01) |
| B01D 53/62 | (2006.01) |
| B01J 20/28 | (2006.01) |
| B01J 20/30 | (2006.01) |
| C10L 3/10  | (2006.01) |

(52) U.S. Cl.
CPC ............ B01J 20/20 (2013.01); B01D 53/025 (2013.01); B01D 53/62 (2013.01); B01J 20/28073 (2013.01); B01J 20/28076 (2013.01); B01J 20/3085 (2013.01); C10L 3/104 (2013.01); B01D 2253/102 (2013.01); B01D 2253/306 (2013.01); B01D 2253/311 (2013.01); B01D 2256/24 (2013.01); B01D 2256/245 (2013.01); B01D 2257/504 (2013.01); C10L 2290/542 (2013.01); Y02A 50/2342 (2018.01); Y02C 10/04 (2013.01)

(58) Field of Classification Search
CPC .......................... B01J 20/20; B01J 20/28073; B01J 20/28076; B01J 20/3085; B01D 53/025; B01D 2253/102; B01D 2253/311; B01D 2256/24; B01D 2257/504; C10L 3/104; C10L 2290/542
See application file for complete search history.

(56) References Cited

U.S. PATENT DOCUMENTS

| 4,082,694 A |   | 4/1978 | Wennerberg et al. |
| 5,214,019 A | * | 5/1993 | Nalette ............ B01D 53/62 423/230 |
| 5,972,834 A |   | 10/1999 | Ohsaki et al. |
| 8,636,830 B2 |  | 1/2014 | Barron et al. |
| 8,840,706 B1 |  | 9/2014 | Srinivasachar |
| 9,034,085 B2 |  | 5/2015 | Barron et al. |
| 9,283,511 B2 |  | 3/2016 | Tour et al. |
| 9,597,656 B2 |  | 3/2017 | Tour et al. |
| 9,604,849 B2 |  | 3/2017 | Tour et al. |
| 2010/0069234 A1 | * | 3/2010 | Willis ............ B01D 53/02 502/401 |
| 2011/0005392 A1 |  | 1/2011 | Pirngruber et al. |
| 2012/0024153 A1 |  | 2/2012 | Barron et al. |
| 2012/0174482 A1 |  | 7/2012 | Atanackovic et al. |
| 2014/0076158 A1 |  | 3/2014 | Tour et al. |
| 2014/0103255 A1 |  | 4/2014 | Barron et al. |
| 2014/0117283 A1 |  | 5/2014 | Liu et al. |
| 2015/0024931 A1 |  | 1/2015 | Tour et al. |
| 2015/0056116 A1 |  | 2/2015 | Tour et al. |
| 2015/0111018 A1 |  | 4/2015 | Tour et al. |
| 2015/0111024 A1 |  | 4/2015 | Tour et al. |
| 2016/0001260 A1 |  | 1/2016 | Tour et al. |

(Continued)

FOREIGN PATENT DOCUMENTS

| CA | 2682892 A1 | 4/2011 |
| WO | WO-2012158194 A1 | 11/2012 |

(Continued)

OTHER PUBLICATIONS

International Search Report and Written Opinion for PCT/US16/48430, dated Nov. 18, 2016.
D'Alessandro, OM et al. Carbon Dioxide Capture: Prospects for New Materials. Angewandte Chemie International Edition. 2010. vol. 49; 6058-6082.
Lu, AH et al. Porous Materials for Carbon Dioxide Capture. Green Chemistry and Sustainable Technology. 2014; 15-77.
Babu, P. et al Medium pressure hydrate based gas separation (HBGS) process for precombustion capture of carbon dioxide employing a novel fixed bed reactor. International Journal of Greenhouse Gas Control 17 (2013) 206-214.

(Continued)

Primary Examiner — Christopher P Jones
(74) Attorney, Agent, or Firm — Winstead PC

(57) ABSTRACT

In some embodiments, the present disclosure pertains to methods of capturing $CO_2$ from an environment by hydrating a porous material with water molecules to the extent thereby to define a preselected region of a plurality of hydrated pores and yet to the extent to allow the preselected region of a plurality of pores of the porous material to uptake gas molecules; positioning the porous material within a $CO_2$ associated environment; and capturing $CO_2$ by the hydrated porous material. In some embodiments, the pore volume of the hydrated porous material includes between 90% and 20% of the pre-hydrated pore volume to provide unhydrated pore volume within the porous material for enhanced selective uptake of $CO_2$ in the $CO_2$ associated environment. In some embodiments, the step of capturing includes forming $CO_2$-hydrates within the pores of the porous material, where the $CO_2 \cdot nH_2O$ ratio is n<4.

22 Claims, 41 Drawing Sheets

(56) References Cited

U.S. PATENT DOCUMENTS

| | | |
|---|---|---|
| 2016/0136613 A1 | 5/2016 | Tour et al. |
| 2017/0001170 A1 | 1/2017 | Ghosh et al. |

FOREIGN PATENT DOCUMENTS

| | | |
|---|---|---|
| WO | WO-2013106712 A1 | 7/2013 |
| WO | WO-2013122631 A1 | 8/2013 |
| WO | WO-2014210295 A2 | 12/2014 |
| WO | WO-2017035250 A1 | 3/2017 |

OTHER PUBLICATIONS

Billemont, P. et al. Adsorption of Carbon Dioxide, Methane, and Their Mixtures in Porous Carbons: Effect of Surface Chemistry, Water Content, and Pore Disorder. Langmuir 2013, 29, 3328-3338.

Sun, Y. et al. $CO_2$ sorption in activated carbon in the presence of water. Chemical Physics Letters 437 (2007) 14-16.

Wang, Y. et al. Comparative studies of $CO_2$ and $CH_4$ sorption on activated carbon in presence of Water. Colloids and Surfaces A: Physicochem. Eng. Aspects 322 (2008) 14-18.

Babu, P. et al. Pre-combustion capture of carbon dioxide in a fixed bed reactor using the clathrate hydrate process. Energy 50 (2013) 364-373.

Zhou, J. et al. Enhanced $CO_2$ Sorption on Ordered Mesoporous Carbon CMK-3 in the Presence of Water. J. Chem. Eng. Data 2016, 61, 1348-1352.

Sun, Y., et al. Sorption equilibria of $CO_2/CH_4$ mixture on activated carbon in presence of water. Journal of Colloid and Interface Science 322 (2008) 22-26.

Zhang, X. et al. Effect of water content on separation of $CO_2/CH_4$ with active carbon by adsorption-hydration hybrid method. Separation and Purification Technology 130 (2014) 132-140.

Wei, Y. et al. Sorption Behavior of Binary Gas $CO_2/CH_4$ on Ordered Mesoporous Carbon with the Presence of Water. J. Chem. Eng. Data 2016, 61, 3341-3345.

Zhang, Z. et al. $CO_2$ sorption in wet ordered mesoporous silica kit-6: effects of water content and mechanism on enhanced sorption capacity. Adsorption (2014) 20:883-888.

Liu, X. et al. Adsorption and regeneration study of the mesoporous adsorbent SBA-15 adapted to the capture/separation of $CO_2$ and $CH_4$. Chemical Engineering Science 62 (2007) 1101-1110.

* cited by examiner

_US 10,232,343 B2_

HYDRATED POROUS MATERIALS FOR SELECTIVE CO₂ CAPTURE

CROSS-REFERENCE TO RELATED APPLICATIONS

This application is a continuation-in-part application of International Patent Application No. PCT/US2016/048430, filed on Aug. 24, 2016, which claims priority to U.S. Provisional Patent Application No. 62/209,489, filed on Aug. 25, 2015. The entirety of each of the aforementioned applications is incorporated herein by reference.

STATEMENT REGARDING FEDERALLY SPONSORED RESEARCH

Not applicable.

BACKGROUND

Current materials utilized to separate carbon dioxide ($CO_2$) from various environments have numerous limitations, including limited $CO_2$ selectivity and sorption capacity. Various embodiments of the present disclosure address the aforementioned limitations.

SUMMARY

In some embodiments, the present disclosure pertains to porous materials for $CO_2$ capture. In some embodiments, the porous material includes a plurality of hydrated pores that are imbibed with water molecules. In some embodiments, the porous materials are hydrated to the extent thereby to define a preselected region of a plurality of hydrated pores and yet to the extent to allow the preselected region of a plurality of pores of the porous material to uptake gas molecules. In some embodiments, the water molecule to carbon weight in the porous material ranges from about 1 to about 5.

In some embodiments, the porous material is a porous carbon material. In some embodiments, the porous carbon material is derived from an asphalt source, such as untreated gilsonite asphalt.

In additional embodiments, the present disclosure pertains to methods of capturing $CO_2$ from an environment by associating the environment with the porous materials of the present disclosure. In some embodiments, the $CO_2$ capture methods of the present disclosure involve one or more of the following steps: hydrating a porous material with water molecules; positioning the porous material within a $CO_2$ associated environment; and capturing $CO_2$ by the hydrated porous material.

In some embodiments, $CO_2$ capture from an environment can occur by various mechanisms, such as the formation of $CO_2$-hydrates within the pores of the porous material. In some embodiments, the $CO_2 \cdot nH_2O$ ratio is n<4. In some embodiments, the environment is a pressurized environment, such as a natural gas stream.

In some embodiments, the porous materials of the present disclosure have a $CO_2$ capture capacity of about 50 wt % to about 250 wt % of the porous material weight. In some embodiments, the capture of $CO_2$ by the porous materials of the present disclosure occurs selectively over hydrocarbons in the environment. For instance, in some embodiments, the molar ratio of captured $CO_2$ over captured hydrocarbons in the porous material ranges from about 10 to about 250. In some embodiments, the molar ratio of captured $CO_2$ over captured hydrocarbons in the porous material ranges from about 50 to about 250. In some embodiments, the molar ratio of captured $CO_2$ over captured hydrocarbons in the porous material is more than about 200.

In some embodiments, the methods of the present disclosure also include a step of releasing the captured $CO_2$ from the porous material. In some embodiments, the releasing occurs by placing the porous material in a second environment that has a lower pressure than the environment where $CO_2$ capture occurred. In additional embodiments, the methods of the present disclosure also include a step of disposing the released $CO_2$. In further embodiments, the methods of the present disclosure also include a step of reusing the porous material after the $CO_2$ release to capture additional $CO_2$ from an environment.

In additional embodiments, the present disclosure pertains to methods of forming the porous materials of the present disclosure. In some embodiments, the methods include: (1) pre-treating a precursor material; (2) activating the pre-treated precursor material to form a porous material with a plurality of pores; and (3) hydrating the pores to result in their infiltration with water molecules.

DESCRIPTION OF THE FIGURES

FIG. 12 shows the excess $CO_2$ uptake isotherms of uGil-600, uGil-700, uGil-800 and uGil-900 at 25° C.

FIG. 18 shows additional data relating to the $CO_2$ and $CH_4$ uptakes of uGil-900.

FIG. 20 shows data relating to the gravimetric excess $CO_2$ and $CH_4$ uptakes of uGil-900.

FIG. 26 shows the effects of temperature, water content, equilibration time and sorption-desorption cycling on $CO_2$ sorption hysteresis.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Numerous sorbents have been utilized to separate $CO_2$ from natural gas and other environments. However, existing sorbents have numerous limitations. Such limitations include limited selectivity for $CO_2$ over hydrocarbons in the environment, and limited $CO_2$ sorption capacities. Various embodiments of the present disclosure address the aforementioned limitations.

Figure 1A:
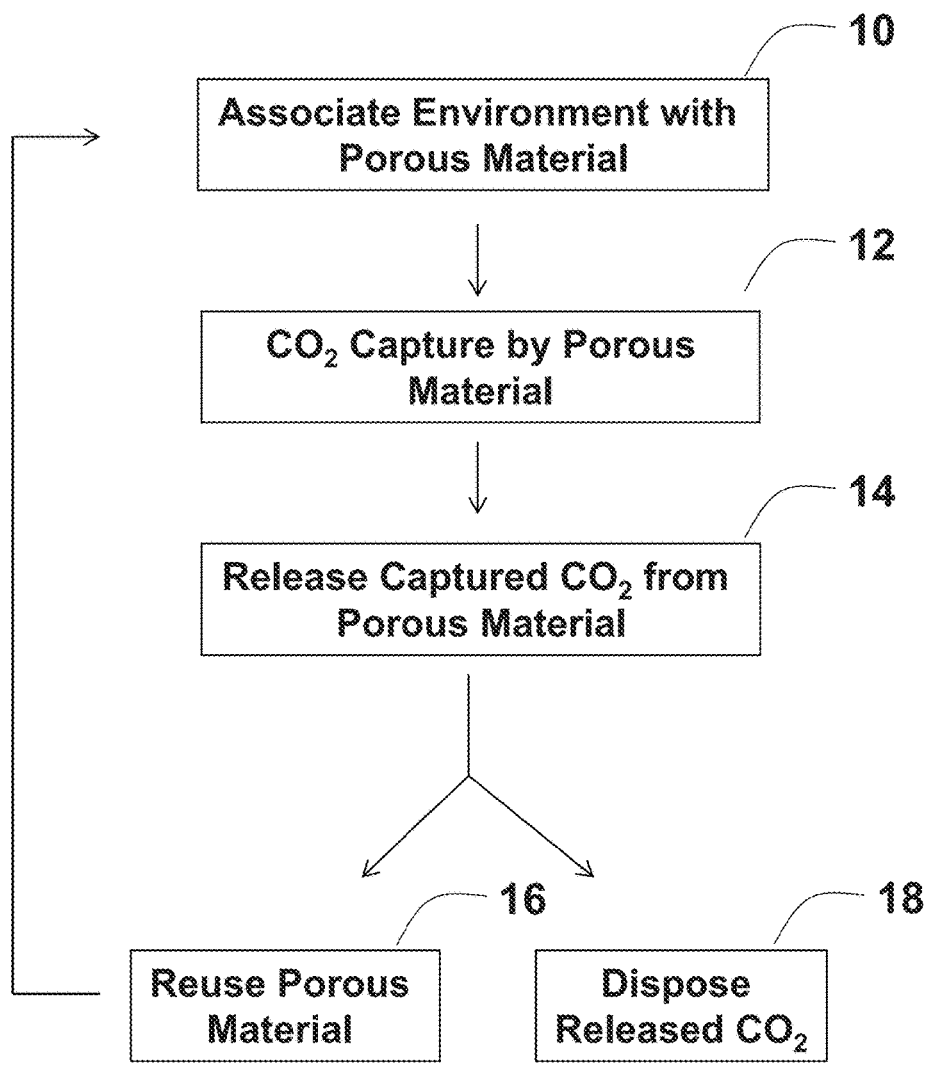
FIGS. 1A-1C provide schemes of methods of utilizing porous materials for carbon dioxide (CO2) capture (FIG. 1A and FIG. 1B), and methods of making the porous materials (FIG. 1C).

In some embodiments, the present disclosure pertains to porous materials for $CO_2$ capture, where the porous materials include a plurality of hydrated pores that are imbibed with water molecules. In some embodiments, the present disclosure pertains to methods of capturing $CO_2$ from an environment by associating the environment with the porous materials of the present disclosure. In more specific embodiments illustrated in FIG. 1A, the methods of the present disclosure involve one or more of the following steps: associating the environment with the porous materials of the present disclosure (step 10) to result in the capture of $CO_2$ by the porous materials (step 12); releasing the captured $CO_2$ from the porous materials (step 14); reusing the porous material for additional $CO_2$ capture (step 16); and disposing the released $CO_2$ (step 18).

Figure 1B:
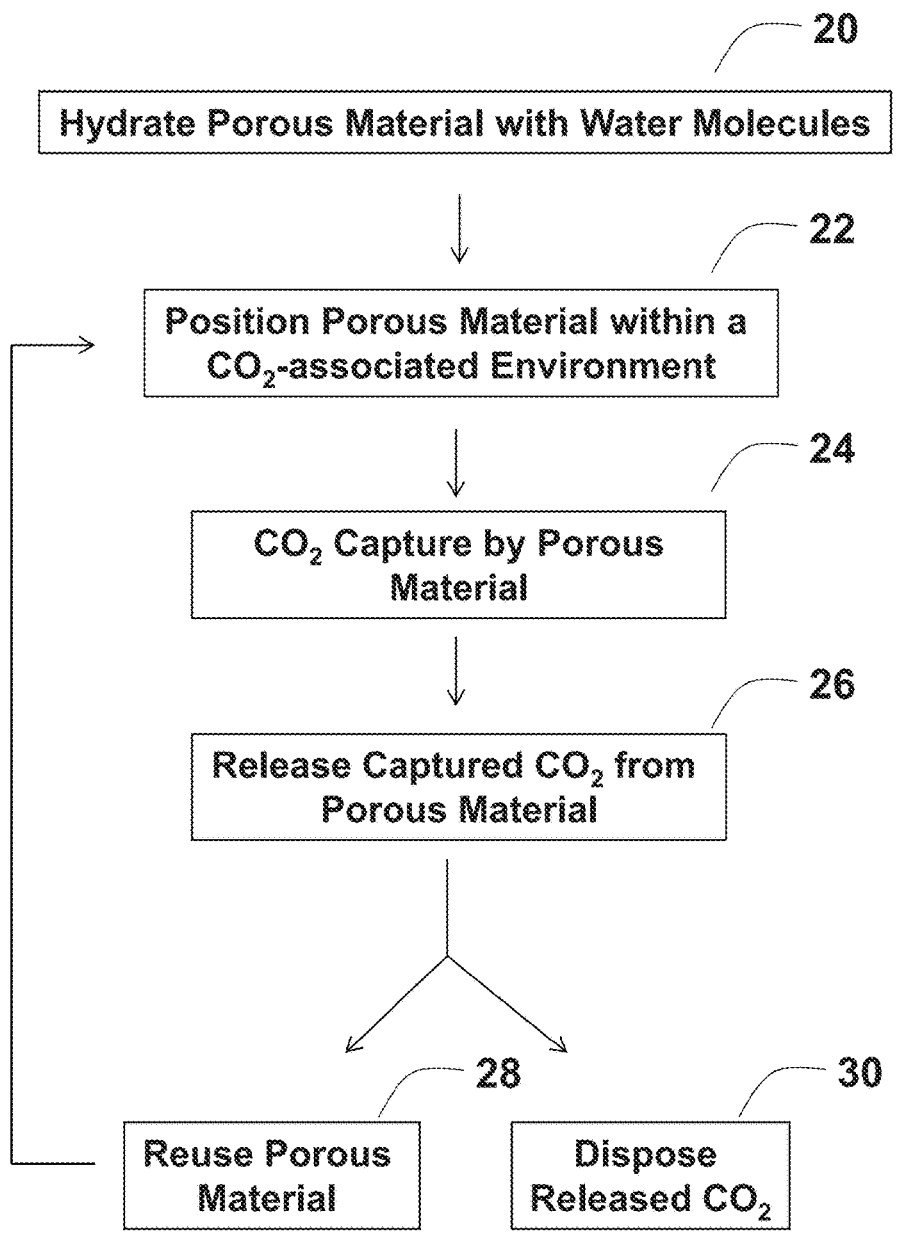

In additional embodiments illustrated in FIG. 1B, the methods of the present disclosure involve one or more of the following steps: hydrating a porous material with water molecules (step 20); positioning the porous material within a $CO_2$ associated environment (step 22); and capturing $CO_2$ by the hydrated porous material (step 24). In additional embodiments that are further illustrated in FIG. 1B, the methods of the present disclosure also include one or more of the following steps: releasing the captured $CO_2$ from the porous materials (step 26); reusing the porous material for additional $CO_2$ capture (step 28); and disposing the released $CO_2$ (step 30).

In additional embodiments, the present disclosure pertains to methods of making the porous materials of the present disclosure. In more specific embodiments illustrated in FIG. 1C, the methods of the present disclosure involve one or more of the following steps: pre-treating a precursor material (step 32); activating the pre-treated precursor material to form porous materials (step 34); and hydrating the pores of the porous materials (step 36).

As set forth in more detail herein, the present disclosure can have various embodiments. In particular, various types of porous materials can be utilized to capture $CO_2$ from various environments by various methods. Moreover, various methods may be utilized to make the porous materials of the present disclosure.

Porous Materials

The porous materials of the present disclosure generally refer to porous materials that include a plurality of hydrated pores. As set forth in more detail herein, the porous materials of the present disclosure can have numerous variations.

Porous Material Types

Various types of porous materials may be utilized in the present disclosure. In general, suitable porous materials include porous materials that include a plurality of hydrated pores.

In addition, the porous materials of the present disclosure can be in various states. For instance, in some embodiments, the porous materials of the present disclosure are carbonized. In some embodiments, the porous materials of the present disclosure are reduced. In some embodiments, the porous materials of the present disclosure are vulcanized.

In some embodiments, the porous materials of the present disclosure are in pelletized form. In some embodiments, the pelletized porous materials are associated with organic or inorganic binders.

In some embodiments, the porous materials of the present disclosure include, without limitation, porous organic frameworks (POFs), metal-organic frameworks (MOFs), zeolites, molecular sieves, porous carbon materials, and combinations thereof.

In some embodiments, the porous materials of the present disclosure include porous carbon materials. The porous carbon materials of the present disclosure can be derived from various carbon sources. For instance, in some embodiments, the porous carbon materials of the present disclosure can be derived from polymers, proteins, carbohydrates, cotton, fat, waste, biochar, coke, asphalt, asphaltenes, anthracite, graphite, coal, oil products, bitumen, tar, pitch, melamine, wood, and combinations thereof.

In some embodiments, the porous carbon materials of the present disclosure are derived from coal. In some embodiments, the coal source includes, without limitation, bituminous coal, anthracitic coal, brown coal, and combinations thereof.

In some embodiments, the porous carbon materials of the present disclosure are derived from protein. In some embodiments, the protein source includes, without limitation, whey protein, rice protein, animal protein, plant protein, and combinations thereof.

In some embodiments, the porous carbon materials of the present disclosure are derived from oil. In some embodiments, the oil products include, without limitation, petroleum oil, plant oil, and combinations thereof.

In some embodiments, the porous carbon materials of the present disclosure are derived from waste. In some embodiments, the waste can include, without limitation, human waste, animal waste, waste derived from municipality sources, and combinations thereof.

In some embodiments, the porous carbon materials of the present disclosure can be derived from asphalt sources. In some embodiments, the asphalt sources include, without limitation, gilsonite asphalt, untreated gilsonite asphalt, naturally occurring asphalt, sulfonated asphalt, asphaltenes, and combinations thereof.

In some embodiments, the porous carbon materials of the present disclosure are derived from gilsonite asphalt, such as Versatrol HT, Versatrol M, and combinations thereof. In some embodiments, the porous carbon materials of the present disclosure are derived from sulfonated asphalt, such as Asphasol Supreme.

Pores

The porous materials of the present disclosure can include various types of pores. For instance, in some embodiments, the pores in the porous materials of the present disclosure include, without limitation, nanopores, micropores, mesopores, macropores, and combinations thereof. In some embodiments, the pores in the porous materials of the present disclosure include micropores, mesopores, and combinations thereof. In some embodiments, the pores in the porous materials of the present disclosure include a mixture of micropores and mesopores.

The pores in the porous materials of the present disclosure can have various diameters. For instance, in some embodiments, the pores in the porous materials of the present disclosure include diameters ranging from about 0.1 nm to about 10 µm. In some embodiments, the pores in the porous materials of the present disclosure include diameters ranging from about 1 nm to about 100 nm. In some embodiments, the pores in the porous materials of the present disclosure include diameters ranging from about 1 nm to about 50 nm. In some embodiments, the pores in the porous materials of the present disclosure include diameters ranging from about 1 nm to about 10 nm.

In some embodiments, the pores in the porous materials of the present disclosure include diameters ranging from about 0.1 nm to about 5 nm. In some embodiments, the pores in the porous materials of the present disclosure include diameters of less than about 3 nm. In some embodiments, the pores in the porous materials of the present disclosure include diameters ranging from about 0.4 nm to about 3 nm.

In some embodiments, the pores in the porous materials of the present disclosure include diameters ranging from about 100 nm to about 10 µm. In some embodiments, the pores in the porous materials of the present disclosure include diameters ranging from about 1 µm to about 10 µm. In some embodiments, the pores in the porous materials of the present disclosure include diameters ranging from about 100 nm to about 1 µm.

The pores in the porous materials of the present disclosure can be hydrated in various manners. For instance, in some embodiments, the pores are embedded with water molecules. In some embodiments, the water molecules are infiltrated within the pores. In some embodiments, the water molecules are imbibed within the pores. In some embodiments, the water molecules are in the form of gas hydrates within the pores. In some embodiments, the water molecules include a form of gas hydrates positioned within the plurality of pores.

The pores in the porous materials of the present disclosure can be hydrated with various water molecules. For instance, in some embodiments, the water molecules may be associated with various water soluble additives (i.e., solutes). In some embodiments, the water soluble additives can include, without limitation, salts, bases, organic solvents, organic amines, fluorocarbons, small molecules, oligomers, polymers, and combinations thereof.

In some embodiments, the water soluble additives can include salts. The salts can include various cations. For instance, in some embodiments, the cations can include, without limitation, monovalent cations (e.g., lithium, sodium, potassium, and combinations thereof), divalent cations (e.g., magnesium, calcium, and combinations thereof), trivalent cations (e.g., aluminum), and combinations thereof.

The salts can also include various anions. For instance, in some embodiments, the anions can include, without limitation, halides, sulfonates, sulfates, nitrates, and combinations thereof.

In some embodiments, the salts can include, without limitation, sodium chloride (NaCl), potassium chloride (KCl), cesium chloride (CsCl), sodium sulfate ($Na_2SO_4$), magnesium sulfate ($MgSO_4$), calcium chloride ($CaCl_2$), and combinations thereof. In some embodiments, the water molecules associated with salts are in the form of brine.

In some embodiments, the water soluble additives can include bases. In some embodiments, the bases can include, without limitation, sodium hydroxide (NaOH), potassium hydroxide (KOH), calcium hydroxide ($Ca(OH)_2$), and combinations thereof.

In some embodiments, the water soluble additives can include organic solvents. In some embodiments, the organic solvents include, without limitation, dimethylsulfoxide (DMSO), dimethylformamide (DMF), alcohols, methanol (MeOH), ethanol (EtOH), isopropanol (iPrOH), acetonitrile ($CH_3CN$), ethylene glycol, glycerin, and combinations thereof.

In some embodiments, the water soluble additives can include organic amines. In some embodiments, the organic amines can include, without limitation, diethanolamine (DEA), monoethanolamine (MEA), methyldiethanolamine (MDEA), diisopropanolamine (DIPA), aminoethoxyethanol (diglycolamine) (DGA), and combinations thereof.

In some embodiments, the water soluble additives can include polymers. In some embodiments, the polymers can include, without limitation, Jeffamine®, poly(ethyleneoxide), polyethylene glycol, polyethyleneimine, poly(methacrylic acid), poly(acrylic acid), poly(ethylene oxide)-poly(butylene terephthalate) (PEOPBT), poly(amide-b-ethylene oxide) copolymer (Pebax), and combinations thereof.

The water soluble additives of the present disclosure can have various concentrations within the pores of the porous material. For instance, in some embodiments, the water soluble additive concentration can vary from about 1 wt % to about 99 wt % relative to water molecules in the pores. In some embodiments, the water soluble additive concentration can vary from about 5 wt % to about 20 wt % relative to water molecules in the pores. In some embodiments, the water soluble additive concentration can be about 99.9 wt % relative to water molecules in the pores.

The pores in the porous materials of the present disclosure can be hydrated with various amounts of water molecules. For instance, in some embodiments, the porous materials are hydrated to the extent thereby to define a preselected region of a plurality of hydrated pores and yet to the extent to allow the preselected region of a plurality of pores of the porous material to uptake gas molecules.

In some embodiments, the water molecule to carbon weight ratios of the porous materials can range from about 1 to about 5. In some embodiments, the water molecule to carbon weight ratios of the porous materials can range from about 1.5 to about 2.5. In some embodiments, the water molecule to carbon weight ratio of the porous materials is less than about 2.5. In some embodiments, the water molecule to carbon weight ratio of the porous materials is about 1.5.

Pore Volumes

The porous materials of the present disclosure can have various pore volumes. For instance, in some embodiments, the porous materials of the present disclosure have pore volumes ranging from about 1 $cm^3/g$ to about 5 $cm^3/g$. In some embodiments, the porous materials of the present disclosure have pore volumes ranging from about 1 $cm^3/g$ to about 3 $cm^3/g$. In some embodiments, the porous materials of the present disclosure have pore volumes ranging from about 1 $cm^3/g$ to about 2.5 $cm^3/g$. In some embodiments, the porous materials of the present disclosure have pore volumes of at least about 2 $cm^3/g$.

Densities

The porous materials of the present disclosure can have various densities. For instance, in some embodiments, the porous materials of the present disclosure have densities ranging from about 0.1 $g/cm^3$ to about 5 $g/cm^3$. In some embodiments, the porous materials of the present disclosure have densities ranging from about 0.1 $g/cm^3$ to about 5 $g/cm^3$. In some embodiments, the porous materials of the present disclosure have densities ranging from about 0.3 $g/cm^3$ to about 4 $g/cm^3$.

In some embodiments, the porous materials of the present disclosure have low densities (e.g., densities lower than about 5 $g/cm^3$, densities lower than about 4 $g/cm^3$, or densities lower than about 1 $g/cm^3$). In some embodiments, the lower densities maximize the porosities and surface areas of the porous materials, which in turn enhance selective $CO_2$ capture by the porous materials.

Surface Areas

The porous materials of the present disclosure can have various surface areas. In some embodiments, the porous materials of the present disclosure have ultra-high surface areas. In some embodiments, the porous materials of the present disclosure include ultra-high surface area porous carbon materials.

In some embodiments, the porous materials of the present disclosure have surface areas ranging from about 500 $m^2/g$ to about 5,000 $m^2/g$. In some embodiments, the porous materials of the present disclosure have surface areas ranging from about 1,500 $m^2/g$ to about 4,000 $m^2/g$. In some embodiments, the porous materials of the present disclosure have surface areas ranging from about 2,500 $m^2/g$ to about 5,000 $m^2/g$. In some embodiments, the porous materials of the present disclosure have surface areas of at least about 2,500 $m^2/g$. In some embodiments, the porous materials of the present disclosure have surface areas of at least about 3,000 $m^2/g$. In some embodiments, the porous materials of the present disclosure have surface areas of at least about 3,500 $m^2/g$. In some embodiments, the porous materials of the present disclosure have surface areas of at least about 4,000 $m^2/g$.

Nucleophilic Moieties

In some embodiments, the porous materials of the present disclosure can also include a plurality of nucleophilic moieties. In some embodiments, the nucleophilic moieties include, without limitation, oxygen-containing moieties, sulfur-containing moieties, metal-containing moieties, metal oxide-containing moieties, metal sulfide-containing moieties, nitrogen-containing moieties, phosphorous-containing moieties, and combinations thereof. In some embodiments, the nucleophilic moieties include nitrogen-containing moieties and sulfur-containing moieties.

In some embodiments, the nucleophilic moieties include nitrogen-containing moieties. In some embodiments, the nitrogen-containing moieties include, without limitation, primary amines, secondary amines, tertiary amines, nitrogen oxides, pyridinic nitrogens, pyrrolic nitrogens, graphitic nitrogens, and combinations thereof.

In some embodiments, the nucleophilic moieties include oxygen-containing moieties. In some embodiments, the oxygen-containing moieties include, without limitation, ether groups, ester groups, epoxy groups, hydroxyl groups, alcohol groups, perfluoro-alcohol groups, and combinations thereof.

Porous Material Structures

The porous materials of the present disclosure can have various structures. For instance, in some embodiments, the porous materials of the present disclosure have an amorphous structure. In some embodiments, the porous materials of the present disclosure have a crystalline structure. In some embodiments, the porous materials of the present disclosure have a graphitic crystalline structure.

In some embodiments, the porous materials of the present disclosure have crystalline portions. For instance, in some embodiments, the porous materials of the present disclosure have crystallinity at the edges. In some embodiments, the crystalline portions of the porous materials are graphitic or graphene-like in morphology.

In more specific embodiments, the porous materials of the present disclosure have high surface areas (e.g., surface areas of at least about 2,500 $m^2/g$), high pore volumes (e.g., pore volumes of at least about 2 $cm^3/g$); small pore diameters (e.g., pore diameters of less than about 3 nm or less than about 30 Å); and small water molecule to carbon weight ratios (e.g., weight ratios of less than about 2.5). In some embodiments, the aforementioned combined properties helps achieve various advantageous properties, such as $CO_2$ capture reversibility and $CO_2$ capture selectivity.

$CO_2$ Capture Environments

The porous materials and methods of the present disclosure can be utilized to capture $CO_2$ from various environments. For instance, in some embodiments, the environment includes, without limitation, industrial gas streams, natural gas streams, natural gas wells, industrial gas wells, oil and gas fields, power plants, and combinations thereof. In some embodiments, the environment includes a natural gas stream, such as a natural gas stream from a natural gas well. In some embodiments, the environment is a power plant, such as a power plant that burns $CO_2$-generating hydrocarbons.

In some embodiments, the $CO_2$ associated environment includes a natural gas stream that also contains water vapor. The water vapor can be present in various amounts. For instance, in some embodiments, the water vapor content can range from about 0.001 wt % to about 5 wt % of the natural gas stream.

In some embodiments, the environment is a pressurized environment. In some embodiments, the environment has a total pressure higher than atmospheric pressure. In some embodiments, the environment has a total pressure of about 5 bar to about 500 bar.

In some embodiments, the environment is an un-pressurized environment. For instance, in some embodiments, the environment has a total pressure that corresponds to atmospheric pressure (i.e., a total pressure of about 1 bar).

Associating Porous Materials with Environments

Various methods may be utilized to associate porous materials with environments. For instance, in some embodiments, the association occurs by placing the porous material at or near the environment. In some embodiments, the association occurs by flowing the environment through a structure that contains the porous material. In some embodiments, the associating occurs by positioning the porous material within a $CO_2$-associated environment.

In some embodiments, the porous material is placed in a pipe, and the $CO_2$-containing environment is flowed through the pipe where it comes in contact with the porous material. In some embodiments, the porous material is in a floating bed that rides on the $CO_2$-containing environment as it enters as a gaseous stream below the bed.

$CO_2$ Capture

The capture of $CO_2$ by the porous materials of the present disclosure can occur in various manners. For instance, in some embodiments, the capture of $CO_2$ by the porous materials of the present disclosure occurs by at least one of sorption, absorption, adsorption, ionic interactions, physisorption, chemisorption, covalent bonding, non-covalent bonding, hydrogen bonding, van der Waals interactions, acid-base interactions, gas-hydrate formation, and combinations thereof. In some embodiments, the capture of $CO_2$ by the porous materials of the present disclosure occurs by sorption. In some embodiments, the capture of $CO_2$ by the porous materials of the present disclosure occurs by physisorption. In some embodiments, the capture of $CO_2$ by the porous materials of the present disclosure occurs by gas-hydrate formation (e.g., $CO_2$-hydrate formation through $CO_2$ interaction with water).

The capture of $CO_2$ by the porous materials of the present disclosure can occur at various pressures. For instance, in some embodiments, the capture of $CO_2$ by the porous materials of the present disclosure occurs above atmospheric pressure. In some embodiments, the capture of $CO_2$ by the porous materials of the present disclosure occurs at total pressures ranging from about 5 bar to about 350 bar. In some embodiments, the capture of $CO_2$ by the porous materials of the present disclosure occurs at partial $CO_2$ pressures ranging from about 0.1 bar to about 300 bar. In some embodiments, the capture of $CO_2$ by the porous materials of the present disclosure occurs at partial $CO_2$ pressures ranging from about 0.1 bar to about 100 bar.

The capture of $CO_2$ by the porous materials of the present disclosure can also occur at various temperatures. For instance, in some embodiments, the capture of $CO_2$ by the porous materials of the present disclosure occurs at temperatures that range from about −50° C. to about 150° C. In some embodiments, the capture of $CO_2$ by the porous materials of the present disclosure occurs at temperatures that range from about 0° C. to about 50° C. In some embodiments, the capture of $CO_2$ by the porous materials of the present disclosure occurs at temperatures that range from about 15° C. to about 30° C. In some embodiments, the capture of $CO_2$ by the porous materials of the present disclosure occurs at room temperature. In some embodiments, the capture of $CO_2$ by the porous materials of the present disclosure occurs without heating the porous material.

$CO_2$ Capture Capacity

The methods and porous materials of the present disclosure can be utilized to capture various amounts of $CO_2$. For instance, in some embodiments, the porous materials of the present disclosure have a $CO_2$ capture capacity of about 50 wt % to about 250 wt % of the porous material weight. In some embodiments, the porous materials of the present disclosure have a $CO_2$ capture capacity of about 100 wt % to about 250 wt % of the porous material weight. In some embodiments, the porous materials of the present disclosure have a $CO_2$ capture capacity of about 150 wt % to about 200 wt % of the porous material weight. In some embodiments, the porous materials of the present disclosure have a $CO_2$ capture capacity of about 180 wt % of the porous material weight.

In some embodiments, the porous materials of the present disclosure have a $CO_2$ capture capacity of at least 200 wt % of the porous material weight. In some embodiments, the porous materials of the present disclosure have a $CO_2$ capture capacity of more than about 200 wt % of the porous material weight. In some embodiments, the porous materials of the present disclosure have a $CO_2$ capture capacity of about 230 wt % of the porous material weight.

In some embodiments, the porous materials of the present disclosure have $CO_2$ capture capacities that increase with environmental pressure. For instance, in some embodiments, the porous materials of the present disclosure have $CO_2$ capture capacities of about 84 wt % at 20 bar, about 143 wt % at 50 bar, and about 154 wt % at 54 bar.

Modes of $CO_2$ Capture

The methods and porous materials of the present disclosure can capture $CO_2$ in various manners. For instance, in some embodiments, the $CO_2$ is converted to poly($CO_2$) within the pores of the porous material. In some embodiments, the $CO_2$ forms $CO_2$-hydrates within the pores of the porous material. In some embodiments, the $CO_2$ forms a $CO_2$ monolayer within the pores of the porous material. In some embodiments, the $CO_2$ forms an ordered matrix within the pores of the porous material. In some embodiments, the $CO_2$ forms a plurality of $CO_2$ monolayers within the pores of the porous material. In some embodiments, the $CO_2$ forms a plurality of $CO_2$ multilayers within the pores of the porous material. In some embodiments, the $CO_2$ forms a plurality of $CO_2$ multilayer $CO_2$-hydrates within the pores of the porous material.

In some embodiments, $CO_2$ capture includes forming $CO_2$-hydrates within the pores of the porous material. In some embodiments, the $CO_2.nH_2O$ ratio is n<4. In some embodiments, n is an integer ranging from 1 to 4. In some embodiments, n is 1. In some embodiments, n is 2. In some embodiments, n is 3. In some embodiments, n is 4.

In some embodiments, the methods of the present disclosure also include a step of forming one or more ordered matrices within the pores. In some embodiments, the one or more ordered matrices include gas-hydrates, such as $CO_2$-hydrates.

Selective $CO_2$ Capture

The methods and porous materials of the present disclosure can be utilized to capture $CO_2$ in a selective manner. For instance, in some embodiments, the capture of $CO_2$ by the porous materials of the present disclosure occurs selectively over hydrocarbons (e.g., methane ($CH_4$)) in the environment. Without being bound by theory, it is envisioned that selective $CO_2$ capture can occur due to the efficient formation of $CO_2$-hydrates over hydrocarbon-hydrates within the hydrated pores of the porous materials.

The selective capture of $CO_2$ over hydrocarbons by the porous materials of the present disclosure can occur at various molar ratios. For instance, in some embodiments, the molar ratio of captured $CO_2$ over captured hydrocarbons in the porous material ranges from about 1 to about 250. In some embodiments, the molar ratio of captured $CO_2$ over captured hydrocarbons in the porous material ranges from about 10 to about 250. In some embodiments, the molar ratio of captured $CO_2$ over captured hydrocarbons in the porous material ranges from about 50 to about 250. In some embodiments, the molar ratio of captured $CO_2$ over captured hydrocarbons in the porous material ranges from about 100 to about 200. In some embodiments, the molar ratio of captured $CO_2$ over captured hydrocarbons in the porous material is more than about 200.

Release of Captured $CO_2$

In some embodiments, the methods and porous materials of the present disclosure can be utilized to reversibly capture $CO_2$ from various environments. As such, in some embodiments, the methods of the present disclosure also include a step of releasing the captured $CO_2$ from the porous materials. In some embodiments, the step of releasing the captured $CO_2$ from the porous material maintains hydration within the porous material.

The release of captured $CO_2$ from the porous materials of the present disclosure can occur in various manners. For instance, in some embodiments, the releasing occurs by decreasing the pressure of the environment. In some embodiments, the releasing occurs by placing the porous material in a second environment. In some embodiments, the second environment has a lower pressure than the environment where $CO_2$ capture occurred.

The release of captured $CO_2$ from the porous materials of the present disclosure can occur at various pressures. For instance, in some embodiments, the releasing occurs at or below atmospheric pressure.

The release of captured $CO_2$ from the porous materials of the present disclosure can occur at various temperatures. For instance, in some embodiments, the releasing occurs at room temperature. In some embodiments, the releasing occurs at the same temperature at which $CO_2$ capture occurred.

In some embodiments, the releasing of captured $CO_2$ occurs without heating the porous material. In some embodiments, the releasing occurs by heating the porous material. For instance, in some embodiments, the porous material may be heated to more than about 20° C. and less than about 300° C.

The release of captured $CO_2$ from the porous materials of the present disclosure can occur by various mechanisms. For instance, in some embodiments, the releasing of the $CO_2$ occurs through depolymerization of formed poly($CO_2$). In some embodiments, the releasing of the $CO_2$ occurs through de-aggregation of formed $CO_2$ monolayers. In some embodiments, the releasing of the $CO_2$ occurs through retro-$CO_2$-hydrate formation back to $CO_2$ and water.

Disposition of Captured $CO_2$

In some embodiments, the methods of the present disclosure also include a step of disposing any $CO_2$ that has been released from the porous materials of the present disclosure. In some embodiments, the disposed $CO_2$ may be utilized for other applications. For instance, in some embodiments, the disposed $CO_2$ may be utilized for applications such as enhanced oil recovery, downhole $CO_2$ storage, or other industrial applications.

Various methods may be utilized to dispose captured $CO_2$. For instance, in some embodiments, the porous materials with the captured $CO_2$ may be subjected to a lower pressure while the $CO_2$ that evolves from the porous material at these lower pressures is pumped below ground or into a pressurized storage facility or into an industrial chemical stream. In some embodiments, the porous materials with the captured $CO_2$ may be subjected to increased temperature while the $CO_2$ that evolves from the porous materials at these increased temperatures is pumped below ground or into a pressurized storage facility or into an industrial chemical stream.

Re-Use of Porous Materials

In some embodiments, the porous materials of the present disclosure are able to regenerate $CO_2$ capture capacity after $CO_2$ release. Thus, in some embodiments, the methods of the present disclosure may also include a step of reusing the porous material (and the plurality of hydrated pores of the porous material) after the releasing to capture additional $CO_2$ from an environment.

In some embodiments, the porous materials of the present disclosure may be reused multiple times without losing $CO_2$ capture or regeneration capacities. For instance, in some embodiments, the porous materials of the present disclosure may be reused anywhere from 4-5 times to over 1,000 times without losing $CO_2$ capture or regeneration capacities.

Methods of Making Porous Materials

Figure 1C:
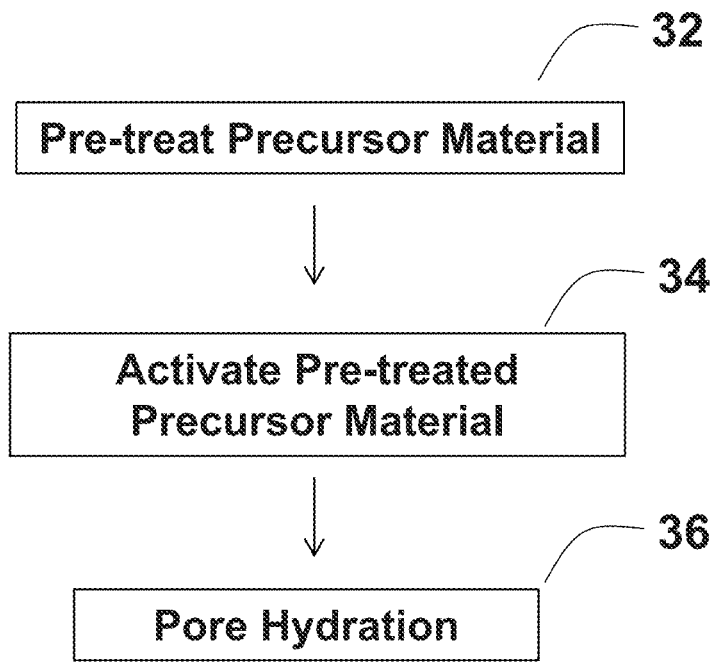

Additional embodiments of the present disclosure pertain to methods of making the porous materials of the present disclosure. For instance, as illustrated in FIG. 1C, the methods of the present disclosure can include steps of pre-treating a precursor material (step 32); activating a pre-treated precursor material to form a porous carbon material with a plurality of pores (step 34); and hydrating the pores of the porous materials (step 36). As set forth in more detail herein, the aforementioned steps can have various embodiments.

Pre-Treatment of Precursor Materials

The methods of the present disclosure can be utilized to pre-treat various precursor materials. Various precursor materials may be pre-treated. For instance, in some embodiments, the precursor materials include, without limitation, organic frameworks, metal-organic frameworks, zeolites, molecular sieves, carbon sources, and combinations thereof.

In some embodiments, the precursor material is a carbon source. In some embodiments, the carbon source includes, without limitation, polymers, proteins, carbohydrates, cotton, fat, waste, biochar, coke, asphalt, asphaltenes, anthracite, graphite, coal, oil products, bitumen, tar, pitch, melamine, wood, and combinations thereof.

In some embodiments, the carbon source includes an asphalt source. In some embodiments, the asphalt source includes, without limitation, gilsonite asphalt, untreated gilsonite asphalt, naturally occurring asphalt, sulfonated asphalt, asphaltenes, and combinations thereof. In some embodiments, the asphalt source includes gilsonite asphalt, such as Versatrol HT, Versatrol M, and combinations thereof. In some embodiments, the asphalt source includes sulfonated asphalt, such as Asphasol Supreme.

The pre-treatment of a precursor material can be utilized to remove volatile organic compounds from the precursor material. In some embodiments, such a pre-treatment can result in the formation of a material with a larger fraction of higher molecular weight $\pi$-conjugated carbons.

Various methods may be utilized to pre-treat a precursor material. For instance, in some embodiments, the pre-treating of the precursor material includes, without limitation, distillation, heating, and combinations thereof.

In some embodiments, the pre-treatment of the precursor material includes heating the precursor material. In some embodiments, the heating of the precursor material occurs at temperatures of at least about 100° C. In some embodiments, the heating of the precursor material occurs at temperatures of at least about 400° C.

Activation of Pre-Treated Precursor Materials

Various methods may also be utilized to activate pre-treated precursor materials. For instance, in some embodiments, the activation of the pre-treated precursor material occurs by carbonization of the pre-treated precursor material. In some embodiments, the carbonization of the pre-treated precursor material occurs by exposing the pre-treated precursor material to a carbonization agent. In some embodiments, the carbonization agent includes, without limitation, metal hydroxides, metal oxides, potassium hydroxide (KOH), sodium hydroxide (NaOH), lithium hydroxide (LiOH), cesium hydroxide (CsOH), magnesium hydroxide ($Mg(OH)_2$), calcium hydroxide ($Ca(OH)_2$), and combinations thereof.

The carbonization of the precursor material can occur at various temperatures. For instance, in some embodiments, the carbonization occurs by heating the precursor material at temperatures ranging from about 200° C. to about 900° C. In some embodiments, the carbonization occurs by heating the precursor material at temperatures ranging from about 600° C. to about 900° C.

Pore Hydration

The pores of the porous materials of the present disclosure can be hydrated in various manners. In some embodiments, pore hydration includes imbibing a plurality of pores of a predefined region of the porous material with water molecules.

In some embodiments, the hydrating occurs by incubating the porous materials with water so that the porous material becomes imbibed with water. In some embodiments, the incubation is followed by treatments that remove the non-imbibed water from the porous materials (e.g., surface water or water not within pores). In some embodiments, the treatments occur at temperatures of at least about 100° C. (e.g., 110° C.). In some embodiments, the incubation occurs under vacuum at low pressures (e.g., 100 mTorr).

Pore hydration can have various effects on porous materials. For instance, in some embodiments, pore hydration decreases the pore volume of porous materials. In some embodiments, prior to the step of hydrating the porous material, the pore volume of the porous material includes at least 0.5 cm$^3$/g to thereby define a pre-hydrated pore volume. After the step of hydrating the porous material, the pore volume of the hydrated porous material includes less than 90% of the pre-hydrated pore volume. This in turn provides unsaturated pores of the porous material that are enhanced for selective uptake of $CO_2$ from a $CO_2$-associated environment.

In some embodiments, pore hydration can reduce saturation of the pores to a value less than 100%. As such, in some embodiments, the methods of the present disclosure also include steps of reducing the saturation of the pores to a value less than 100%.

In some embodiments, the pore volume of the hydrated porous material includes between 90% and 20% of the pre-hydrated pore volume. In some embodiments, the pore volume of the hydrated porous material still provides pore volumes that have remained unhydrated (i.e., unhydrated pore volume) within the porous material. In some embodiments, the unhydrated pore volume provides for enhanced selective uptake of $CO_2$ in the $CO_2$ associated environment.

Pore volumes can be determined by various methods and measurements. As such, in some embodiments, the methods of the present disclosure also include steps of determining pore volume. In some embodiment, pore volume is determined by porosimetry measurements.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Ultra-High Surface Area Activated Porous Asphalt for $CO_2$ Capture Through Competitive Adsorption at High Pressures In this Example, Applicants report an improved method for activating asphalt to produce ultra-high surface area porous carbons. Pre-treatment of asphalt (untreated Gilsonite, uGil) at 400° C. for 3 hours removes the more volatile organic compounds to form a pretreated asphalt (uGil-P) material with a larger fraction of higher molecular weight π-conjugated asphaltenes. Subsequent activation of uGil-P at 900° C. gives an ultra-high surface area (4200 m$^2$ g$^{-1}$) porous carbon material (uGil-900) with a mixed micro and mesoporous structure. The produced uGil-900 shows enhanced room temperature carbon dioxide ($CO_2$) uptake capacity of 154 wt % (35 mmol g$^{-1}$) at 54 bar, and a $CH_4$ uptake capacity of 37.5 wt % (24 mmol g$^{-1}$) at 300 bar. The room temperature working $CO_2$ uptake capacity for uGil-900 is 19.1 mmol g$^{-1}$ (84 wt %) at 20 bar and 32.6 mmol g$^{-1}$ (143 wt %) at 50 bar.

Example 1.1. Synthesis and Characterization of Porous Carbon Materials

Figure 2:
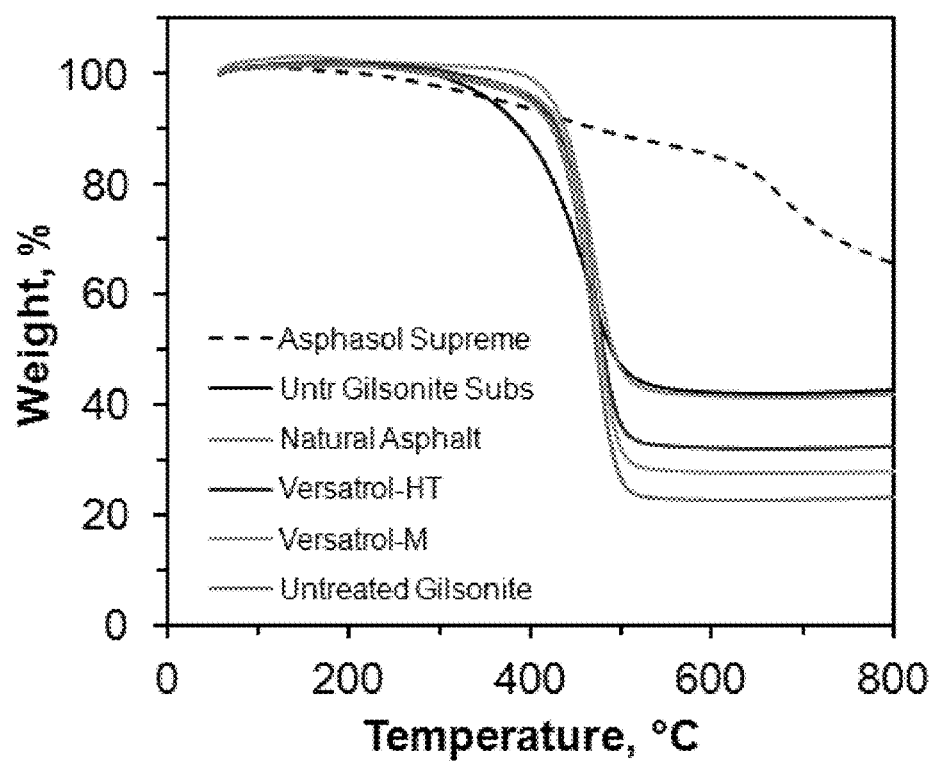
FIG. 2 shows thermogravimetric analysis (TGA) curves for various commercial asphalts.

Asphalt is the heaviest fraction of oil, which consists of a mixture of high boiling organic molecules. A relatively well-defined fraction of heavy oil is the asphaltenes, a porous network formed from the combination of large polyaromatic and polyaliphatic cyclic systems interconnected via short alkyl chains and complexes of non-covalent interactions. As shown in FIG. 2, the thermogravimetric analysis (TGA) of various asphalts from different sources reveals the similar weight loss profiles for most of the studied samples.

Except for Asphasol Supreme, which primarily consists of various inorganic sulfate salts, all studied asphalts start to lose weight beginning at about 400° C. Moreover, the asphalts lose from about 60% to about 80% of their original weight by 500° C. The weight loss is mainly due to the evaporation of lower molecular weight volatile organic oil residues.

Direct activation of raw asphalts with potassium hydroxide (KOH) in a single step resulted in the formation of porous carbons with smaller surface areas and lower gas uptake performances, except for Versatrol HT, which has a low amount of volatile organic components. Therefore, unlike the previously reported methods of direct one step activation of asphalts with KOH, this Example reports an improved method of synthesis of porous carbons using a two-step process, as shown in FIG. 3, which nearly doubles the surface area of the porous carbons and substantially increases the $CO_2/CH_4$ displacement constants (D).

Figure 3:
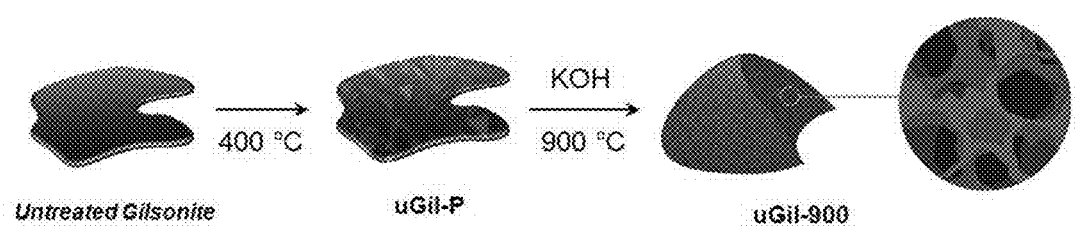
FIG. 3 provides a schematic illustration of the preparation of porous carbon materials from asphalt.
Figure 4A:
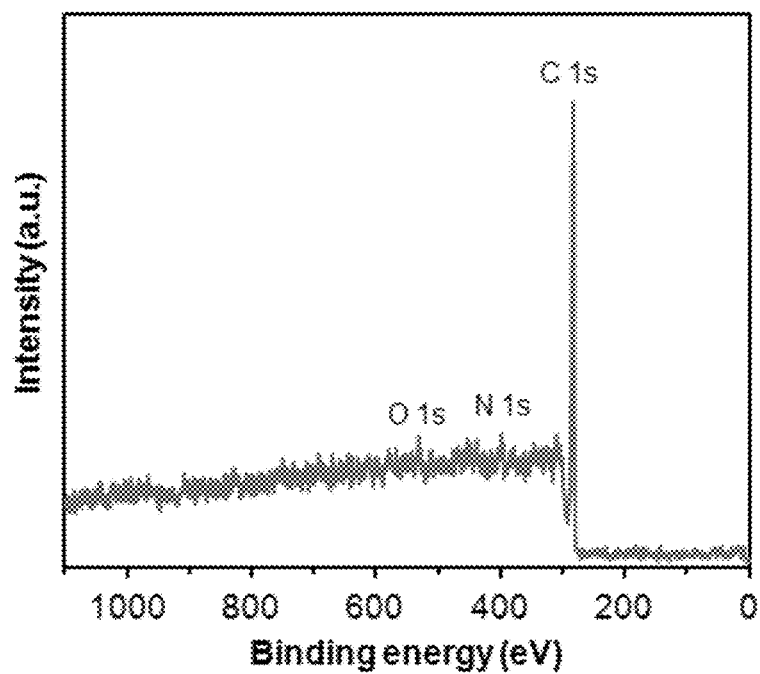
FIG. 4 shows X-ray photoelectron spectra (XPS) of untreated Gilsonite (uGil). Shown are the survey spectrum (FIG. 4A), and the high-resolution XPS C 1 s spectrum (FIG. 4B).
Figure 4B:
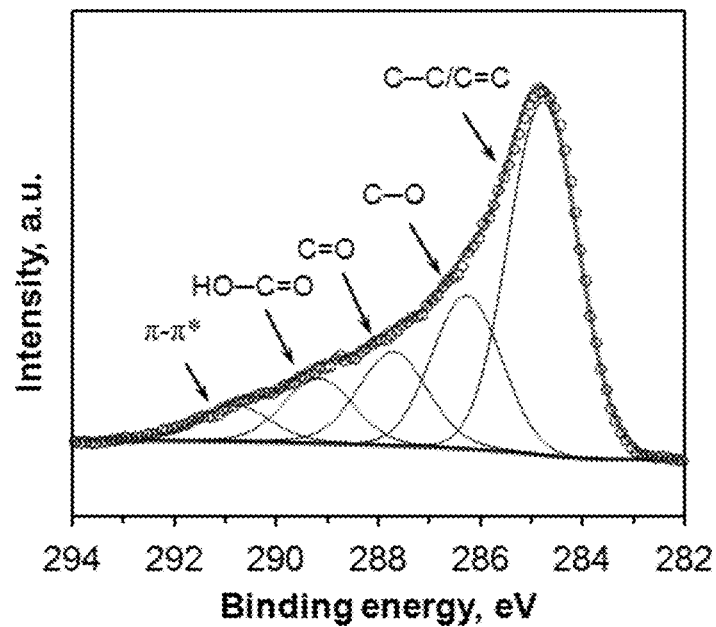
Figure 5A:
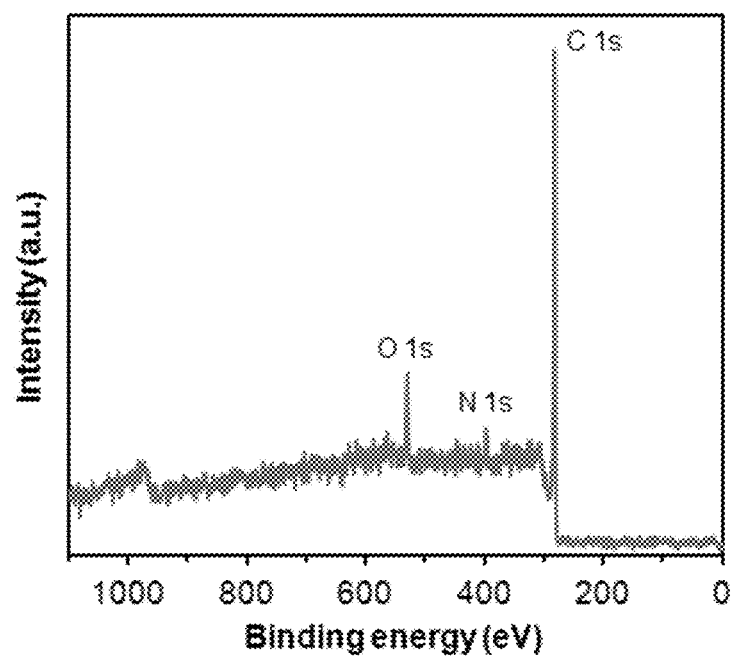
FIG. 5 shows XPS of pre-treated uGil (uGil-P). Shown are the survey spectrum (FIG. 5A) and the high-resolution XPS C is spectrum (FIG. 5B).
Figure 5B:
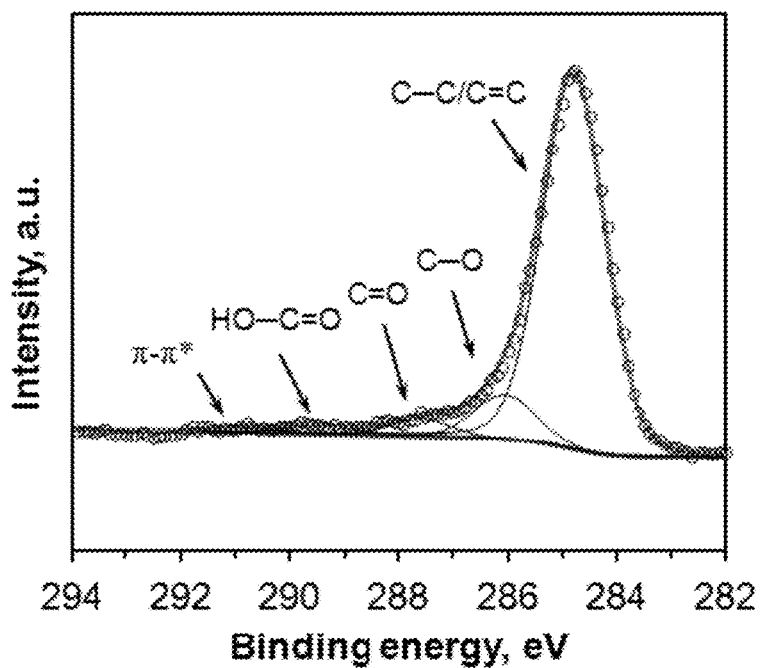

After uGil was treated at 400° C. for 3 hours under inert atmosphere and ambient pressure in a tube furnace, it afforded pretreated asphalt (uGil-P) in 40% yield (FIG. 3). X-ray photoelectron spectroscopy (XPS) analysis reveals a decrease in the relative amounts of oxygen functionalities after this thermalization step (see Tables 1-2 and FIGS. 4-5) due to evaporation of various lower molecular weight oxygen-containing organic species, such as esters, ethers, alcohols and carbonyls. This pre-treatment step is desirable to form higher boiling species containing primarily carbon-rich polycyclic aromatic hydrocarbons that are more accessible for carbonization.

TABLE 1

Relative distributions of deconvoluted C 1s peaks of high resolution XPS spectrum of uGil, uGil-P and uGil-900.

| Functional groups | eV | at % |
|---|---|---|
| C 1s (Untreated Gilsonite, uGil) | | |
| C=C/C—C | 284.8 | 49.3 |
| C—O | 286.3 | 21.4 |
| C=O | 287.7 | 14.2 |
| O—C=O | 289.2 | 9.5 |
| π-π*(C=C) | 290.8 | 5.6 |
| C 1s (uGil-P) | | |
| C=C/C—C | 284.8 | 84.1 |
| C—O | 286.1 | 9.3 |
| C=O | 287.6 | 3.7 |
| O—C=O | 289.5 | 1.7 |
| π-π*(C=C) | 290.8 | 1.2 |

TABLE 1-continued

Relative distributions of deconvoluted C 1s peaks of high resolution XPS spectrum of uGil, uGil-P and uGil-900.

| Functional groups | eV | at % |
|---|---|---|
| C 1s (uGil-900) | | |
| C=C/C—C | 284.8 | 71.8 |
| C—O | 286.2 | 12.6 |
| C=O | 287.4 | 7.9 |
| O—C=O | 289.0 | 4.6 |
| π-π*(C=C) | 290.6 | 3.2 |

TABLE 2

Elemental composition of uGil and uGil-P at 400° C.

| | XPS | | | | | |
|---|---|---|---|---|---|---|
| Samples | C % | O % | N % | Pyridinic N % | Pyrrolic N % | Graphitic N % |
| uGil | 93.9 | 6.1 | <0.1 | 68.3 | 31.7 | — |
| uGil-P | 89.1 | 9.6 | 1.3 | 38.9 | 61.1 | — |

Figure 9:
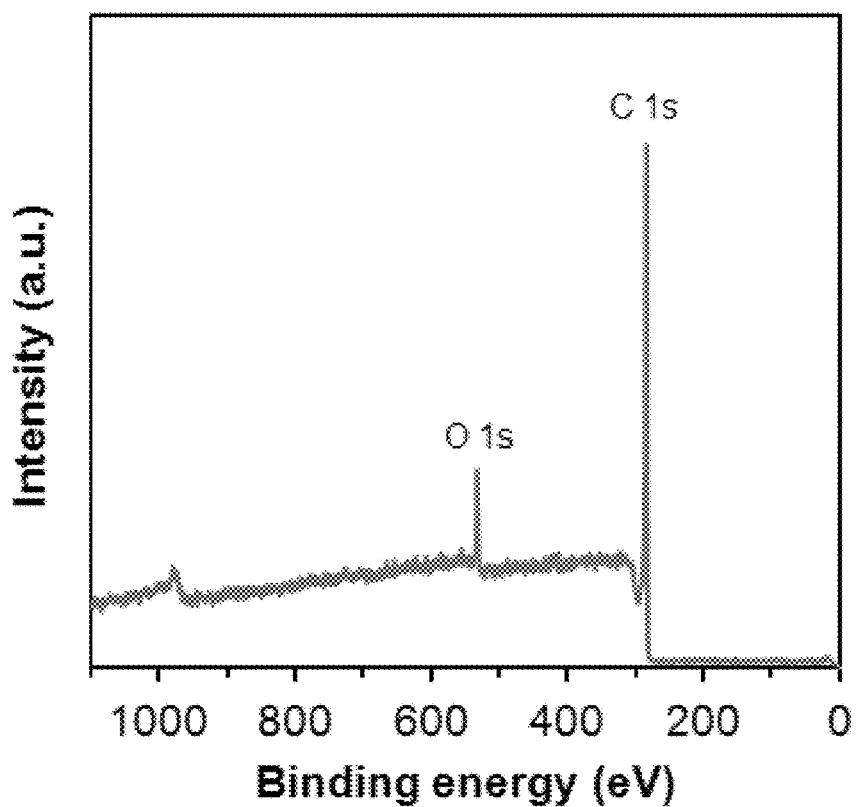
FIG. 9 shows an XPS (survey spectrum) of uGil-900.

Subsequent activation of uGil-P with 4 equivalents of KOH at various temperatures (600, 700, 800 and 900° C.) for 20 minutes provides porous carbons uGil-600, uGil-700, uGil-800 and uGil-900, respectively. The uGil-900 was characterized by scanning electron microscopy (SEM), high-resolution transmission electron microscopy (HR-TEM), powder X-ray diffraction (PXRD) and XPS (FIGS. 6 and 9).

Figure 6A:
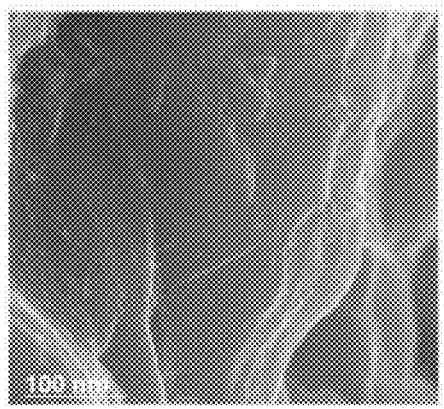
FIG. 6 shows scanning electron microscopy (SEM) (FIG. 6A) and high-resolution transmission electron microscopy (HRTEM) (FIG. 6B) images of uGil carbonized at 900° C. (uGil-900). Also shown are the powder X-ray diffraction (PXRD) pattern (FIG. 6C) and high-resolution XPS C is spectrum (FIG. 6D) of uGil-900.
Figure 6B:
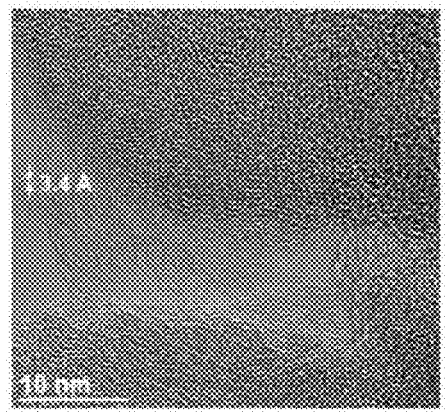
Figure 7:
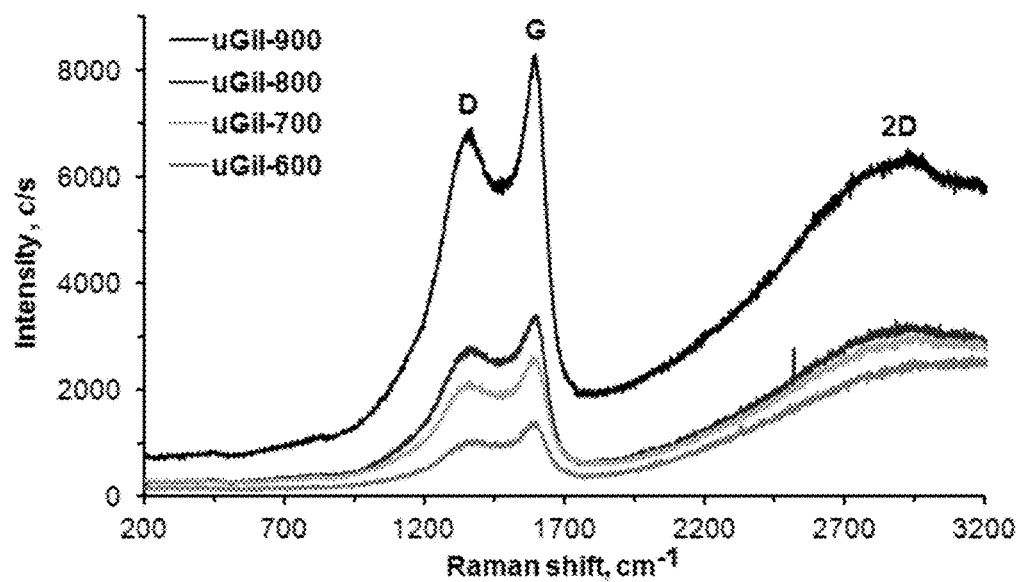
FIG. 7 shows the Raman spectra of uGil-600, uGil-700, uGil-800 and uGil-900.

SEM images of the uGil-900 show formation of the mesoporous carbon structure, a typical morphology for activated carbons (FIG. 6A). While the HRTEM displays the dominant presence of amorphous carbon, the HRTEM reveals the formation of graphitic crystalline stacked layers at the edges with the average stacking distance of about 3.4 Å (FIG. 6B). Raman spectroscopy shows higher intensities of G and D as well as 2D bands upon increasing the activation temperatures, further indicating formation of larger crystalline graphitic domains at higher activation temperatures (FIG. 7).

Figure 6C:
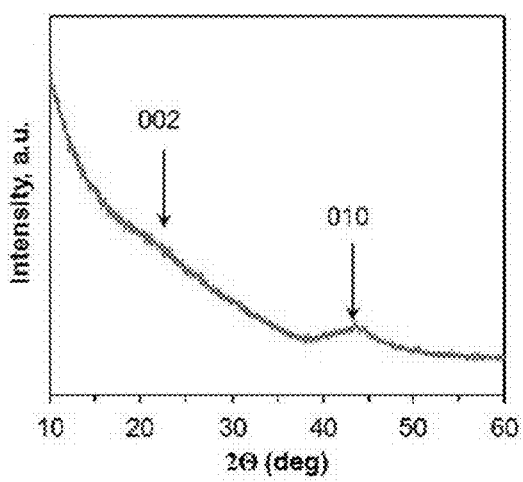

The PXRD patterns of bulk uGil-900 shown in FIG. 6C display two weak and broad peaks at 23° and 44°. The absence of sharp peaks reveals the amorphous nature of the material. The peak at 23° corresponds to the 002 crystalline region of the diffractions for layering of graphitic carbons. The peak at 44° corresponds to the 010 region. The results affirm the formation of a smaller two-dimensional lattice in uGil-900, as affirmed by the HRTEM result in FIG. 6B.

The porous carbons were further characterized by XPS. Surface analyses reveal the presence of oxygen functionalities (Table 3). Moreover, the relative oxygen content decreases as the activation temperature increases. The oxygen content was raised relative to uGil-P due to hydroxide treatment.

TABLE 3

Properties and $CO_2/CH_4$ uptake performances of porous carbon materials derived from asphalt.

| Samples | $S_{BET}$ $(m^2 g^{-1})^a$ | Total pore volume $(cm^3 g^{-1})^b$ | $D_{pore}$ $(nm)^c$ | Density $g\ cm^{-3}$ | XPS C % | XPS O % | $CO_2$ uptake capacity at 54 bar$^d$ nmol $g^{-1}$ | $CO_2$ uptake capacity at 54 bar$^d$ wt % | $CH_4$ uptake capacity at 60 bar$^d$ nmol $g^{-1}$ | $CH_4$ uptake capacity at 60 bar$^d$ wt % |
|---|---|---|---|---|---|---|---|---|---|---|
| A-PC$^e$ | 2800 | 1.37 | 2.30 | 0.33 | 90.1 | 9.9 | 21.1 | 93 | 13.1 | 21 |
| uGil-600 | 2300 | 1.31 | 2.13 | 0.42 | 84.9 | 15.1 | 19.8 | 87 | 12.5 | 20 |
| uGil-700 | 3600 | 2.11 | 2.21 | 0.37 | 88.7 | 11.3 | 26.8 | 118 | 15.0 | 24 |
| uGil-800 | 3800 | 2.22 | 2.25 | 0.38 | 91.5 | 8.5 | 31.4 | 138 | 15.8 | 25 |
| uGil-900 | 4200 | 2.41 | 2.30 | 0.37 | 93.2 | 6.8 | 35.0 | 154 | 17.1 | 27 |

$^a$Surface area estimated from $N_2$ absorption isotherms at 77 K and was determined using the data in the relative pressure range of 0.1 to 0.3 bar. Samples were dried at 240° C. for 20 hours prior to the measurements.
$^b$Total (micro- and meso-) pore volume obtained at $P/P_0 = 0.994$.
$^c$Average pore diameter ($D_{pore}$).
$^d$Absolute $CO_2$ and $CH_4$ uptake at 25° C.
$^e$From ACS Appl. Mater. Interfaces 2015, 7, 1376.

Figure 6D:
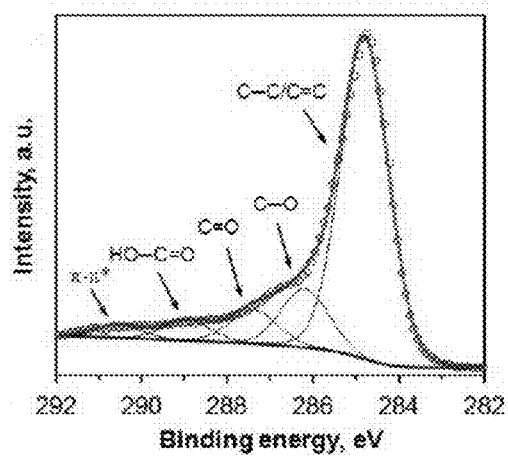

FIG. 6D shows the deconvoluted peaks of high resolution XPS spectra (C 1s) of uGil-900. From the deconvoluted C1s peaks (Table 1), it is apparent that the oxygen-containing groups are predominantly in the form of ether, epoxy and hydroxyl (C—O, C—O—C, and C—OH, 286.2 eV) groups. There are also carbonyl (C=O, 287.4 eV) groups in the form of ketones or quinones and carboxyl (HO—C=O, 289.0 eV) groups. The spectra were centered at 284.8 eV for the graphitic carbon (C—C/C=C). Relative contributions of each functional group are summarized in Table 1.

Figures 8A, 8B:
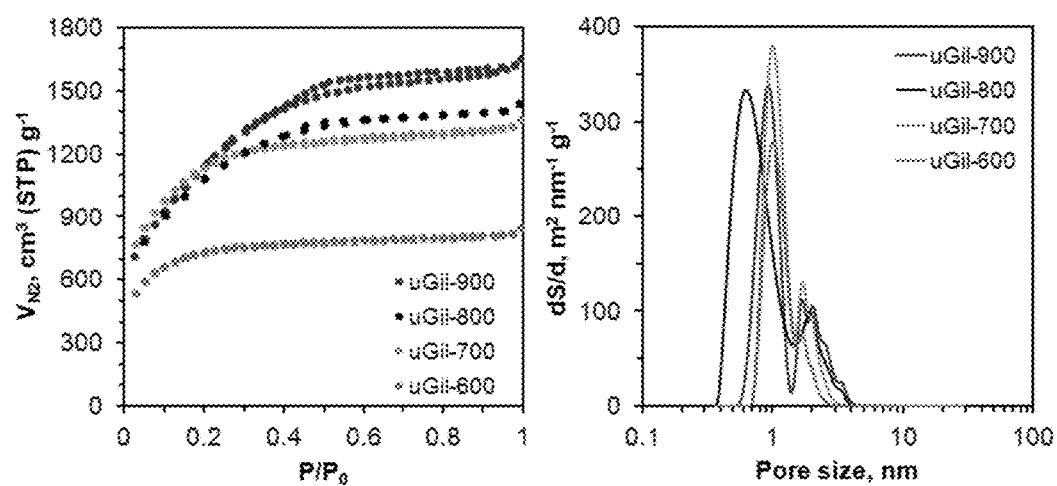
FIG. 8 shows the nitrogen sorption isotherms at 77 K (FIG. 8A) and differential nonlocal density functional theory (NLDFT) pore size distribution curves (FIG. 8B) of uGil-600, uGil-700, uGil-800 and uGil-900. Also shown is a pore size distribution curve for uGil-900 estimated using NLDFT from $N_2$ sorption isotherms (FIG. 8C). Also shown is a cumulative pore volume for uGil-900 estimated using NLDFT (FIG. 8D).
Figure 8C:
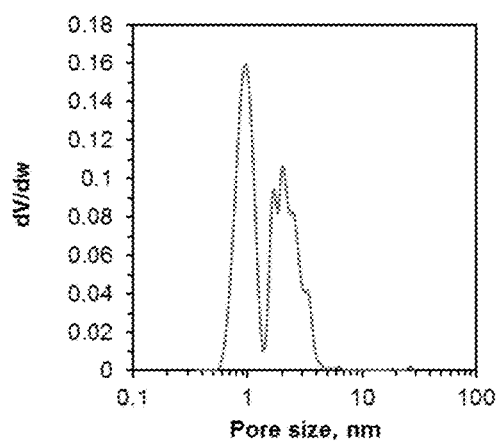

Structural properties such as porosity, surface area, pore volume and pore size distributions of porous carbons were characterized by means of nitrogen ($N_2$, 77 K) sorption isotherms (FIG. 8) and summarized in Table 3. These results are consistent with morphologies revealed from the SEM and TEM analyses. The shape of the isotherms depends on the carbonization temperature. The shapes gradually transform from Type-I (microporous materials with a steep increase at low partial pressure) to mixed Type-I and Type-IV (isotherms with micro- and mesopores) (FIG. 8A).

An increase in carbonization temperature from 600° C. to 900° C. provides substantial increases in the Brunauer-Emmett-Teller (BET) specific surface area ($S_{BET}$) (i.e., from 2300 $m^2 g^{-1}$ to 4200 $m^2 g^{-1}$) and the pore volumes (i.e., from 1.31 $cm^3 g^{-1}$ to 2.41 $cm^3 g^{-1}$). The average pore sizes also tend to increase with carbonization temperature (Table 3). A dominant presence of microporous morphologies generated at lower carbonization temperature is also noticeable from the higher apparent density for uGil-600 (Table 3).

Collapsing of the macropores and mesopores is common during the packing of porous carbon materials under high pressure. It is noteworthy that the theoretical surface area of a double sided separated graphene sheet is 2630 m$^2$ g$^{-1}$, and such a high value for surface area in the uGil-900 is explained by the stacking of the gas molecules within the pores.

Figure 10:
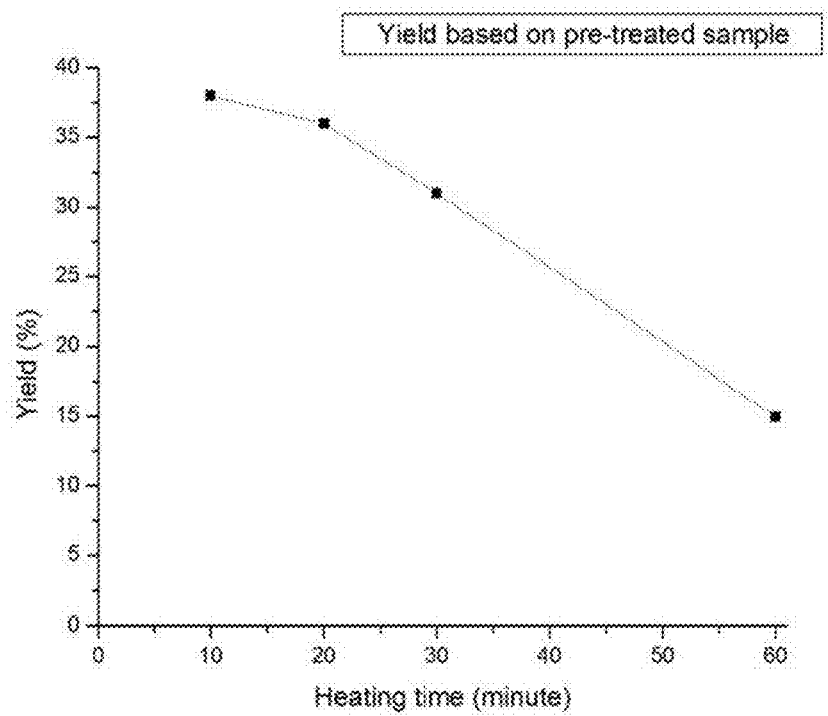
FIG. 10 shows the uGil-900 yield based on the carbonization of uGil-P at 900° C. For the material used in this study, the heating time was 20 minutes.
Figure 11:
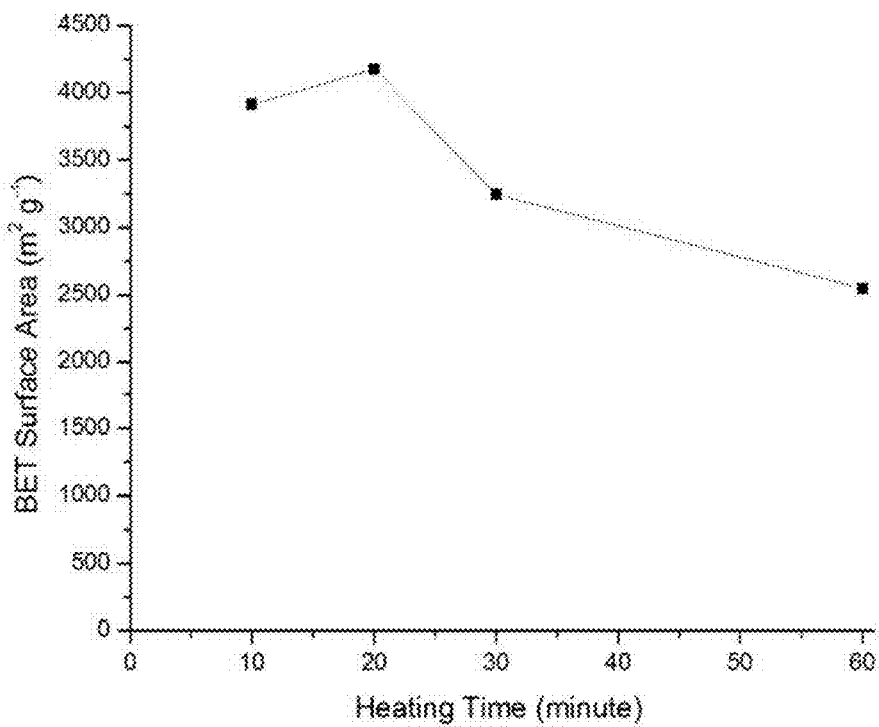
FIG. 11 shows the Brunauer-Emmett-Teller (BET) surface areas of uGil-900 with different heating times during carbonization at 900° C.

The yield of the carbon material, from the uGil-P, decreased from 37% to 13% by increasing the time from 10 to 60 minutes of KOH treatment at 900° C. (FIG. 10). Upon prolonged KOH treatment at 900° C., the surface area also reduced to 2500 m$^2$ g$^{-1}$ (FIG. 11). Hence, the short activation time (15 to 20 minutes) at 900° C. is the optimal condition for this ultra-high surface area carbon.

Figure 8D:
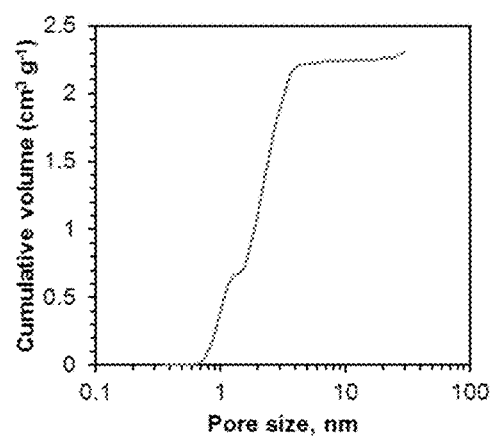

The nitrogen adsorption-desorption isotherms exhibit hysteresis loops for uGil-800 and uGil-900, reflecting the ink-bottle shaped mesopores. Further details of the pores are corroborated by the pore size distributions (PSDs) based on NLDFT models (FIG. 8B). The results show that the porous carbons have narrow PSDs mainly centered in micro (~1.0 nm) and mesopore (~2 to 4 nm) regions. Mesoporosity expanded for uGil-900 with the maximum at 2.0 nm (FIG. 8B), which also resulted in larger average pore sizes (Table 3). Also shown are pore size distribution curves for uGil-900 estimated using NLDFT from $N_2$ sorption isotherms (FIG. 8C) and cumulative pore volume estimated using NLDFT (FIG. 8D).

The results reveal that surface area gradually increases with the carbonization temperature as a result of the formation of mesopores. Further increase in the carbonization temperature or the heating time resulted in the lowering of the surface area and the yield of the resultant porous material (FIGS. 10-11).

Example 1.2. High Pressure $CO_2$ and $CH_4$ Uptake

Applicants recently reported asphalt-derived porous carbons (A-PC) prepared by a direct single step chemical carbonization method which possess high $CO_2$ and $CH_4$ uptake performances (*ACS Appl. Mater. Interfaces* 2015, 7, 1376). The pretreatment step disclosed here increased the surface area of the A-PC from 2800 m$^2$ g$^{-1}$ to 4200 m$^2$ g$^{-1}$ and allowed Applicants to use inexpensive asphalt sources.

The highest surface area porous carbon, uGil-900, has uniform and narrow distribution of micro and mesoporosity. Moreover, uGil-900 exhibits exceptional room temperature $CO_2$ uptake capacity at 54 bar, and $CH_4$ uptake capacity at 300 bar of 154 wt % (35 mmol g$^{-1}$) and 37.5 wt % (24 mmol g$^{-1}$), respectively. The 54 bar pressure is the critical point for $CO_2$ at 25° C. The 300 bar pressure was chosen as a common working pressure of the natural gas wells.

Figure 12A:
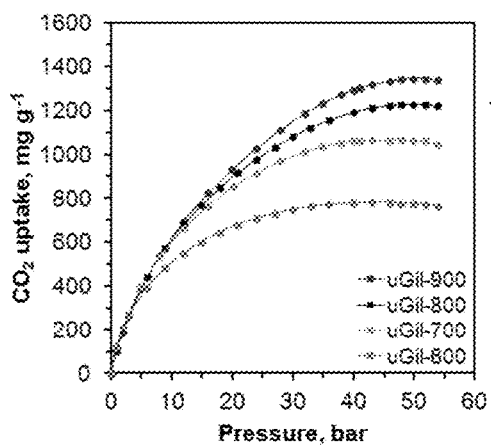
(FIG. 12A); and the absolute and excess $CO_2$ and $CH_4$ uptake isotherms of uGil-900 at 25° C.

Excess $CO_2$ uptake isotherms were measured at 25° C. As expected, uGil-900 shows one of the highest $CO_2$ and $CH_4$ uptakes among the porous carbonaceous materials (Table 3 and FIGS. 12-13).

Figures 14A, 14B:
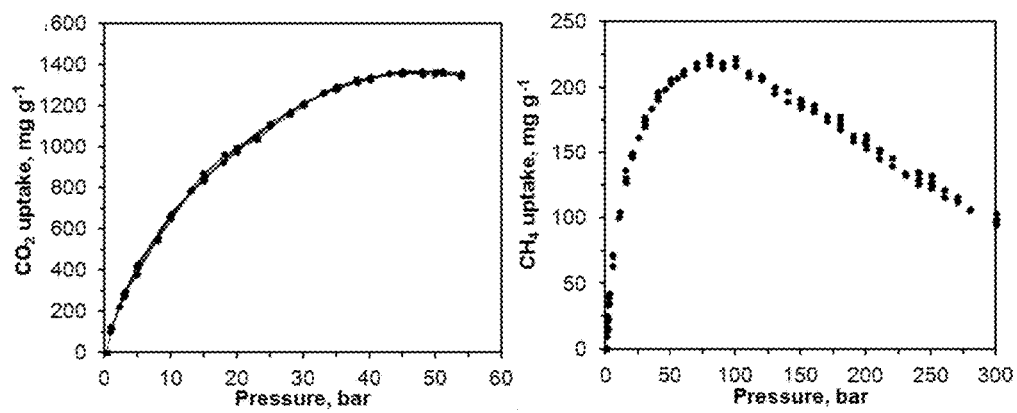
FIG. 14 shows 5 cycles of excess $CO_2$ (FIG. 14A) and methane ($CH_4$) uptake (FIG. 14B) with uGil-900 at 25° C. These measurements were performed using a gravimetric gas uptake apparatus.

The gas uptake performance of uGil-900 is comparable with the ultra-high surface area metal organic frameworks (MOFs) used under similar conditions, even though it is far less expensive to prepare. $CO_2$ uptake does not show any hysteresis, which suggests the reversible nature of $CO_2$ uptake of the materials. No degradation of the porous carbons is observed during the multiple $CO_2$ and $CH_4$ sorption-desorption processes from 0 to 54 bar and 0 to 300 bar, respectively (FIG. 14). Excess $CO_2$ uptake isotherms reveal that at 54 bar uGil-900 still does not reach its saturation uptake. On the other hand, from the excess $CH_4$ uptake isotherm of uGil-900 (FIG. 12B), it is clear that it reaches the saturation uptake at 90 bar (21.9 wt %).

Figure 12B:
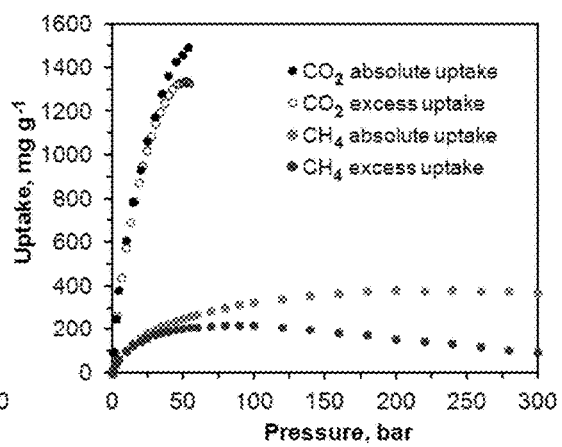
(FIG. 12B). These measurements were performed using a gravimetric gas uptake apparatus.
Figure 13:
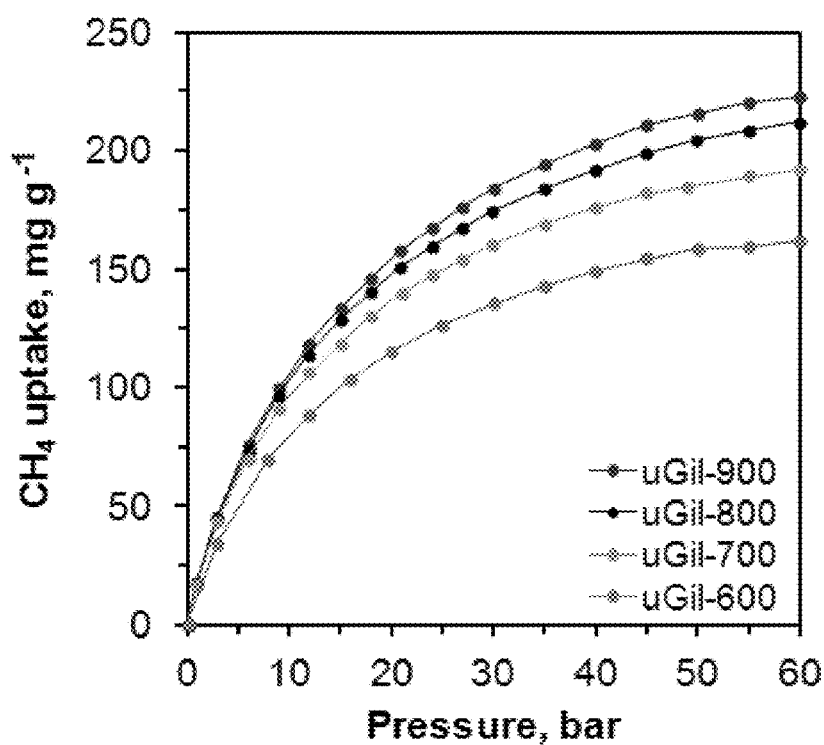
FIG. 13 shows excess $CO_2$ uptake isotherms of uGil-600, uGil-700, uGil-800 and uGil-900 at 25° C. These measurements were performed using a gravimetric gas uptake apparatus.

Applicants further estimated the absolute gas uptakes using the pore volume and the density of gases at 25° C. (FIG. 12B). The room temperature absolute $CO_2$ and $CH_4$ uptake isotherms show higher uptakes than excess gas uptakes. For $CH_4$, it reached the saturation uptake (37.5 wt %) and exhibited constant absolute uptake beyond 150 bar. However, the absolute $CO_2$ uptake isotherm still was not saturated, showing an increase in uptake with pressure, pointing to the exceedingly high absolute uptake of 154 wt % (FIG. 12B), beyond the critical point of $CO_2$.

It is evident that uGil-900 has ultra-high surface area and reaches the ultimate $CO_2$ and $CH_4$ uptake capacity among the porous carbonaceous materials. The room temperature working $CH_4$ uptake capacity for uGil-900 is 11.6 mmol g$^{-1}$ (18.5 wt %) at 30 bar and 16.1 mmol g$^{-1}$ (25.7 wt %) at 60 bar, which can be calculated as the difference between the absolute uptake at low pressures (1 bar) and higher pressures (30 and 60 bar, respectively).

Example 1.3. $CO_2$ Versus $CH_4$ Displacement Measurements

Figure 15:
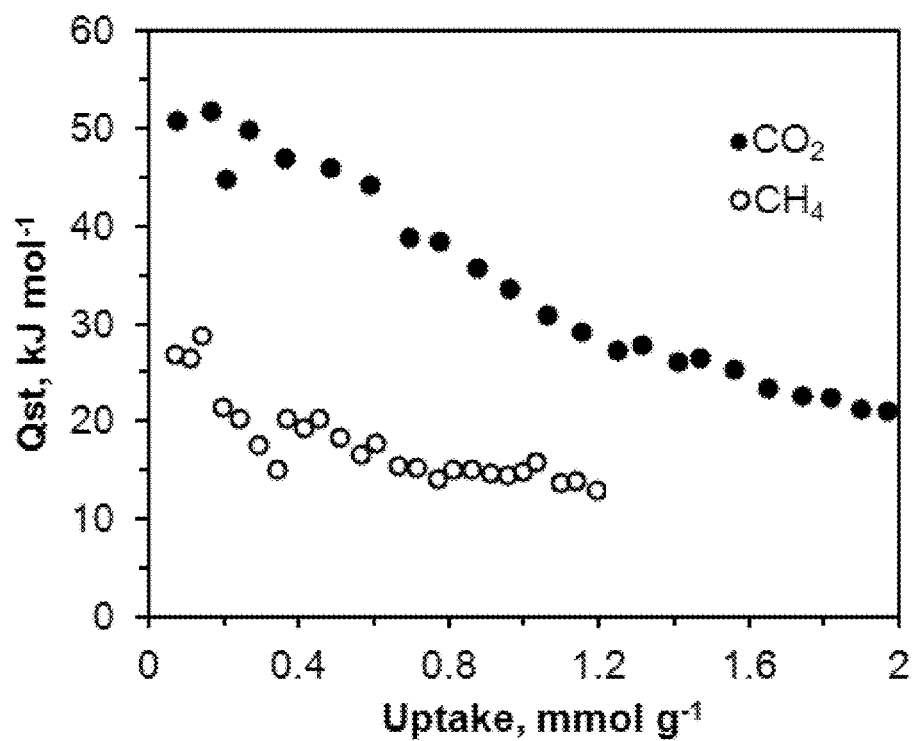
FIG. 15 shows isosteric heat of absorption ($Q_{st}$) for $CH_4$ and $CO_2$ on uGil-900 estimated from the data at 25 and 30° C. These measurements were performed using a volumetric gas uptake apparatus.
Figure 16:
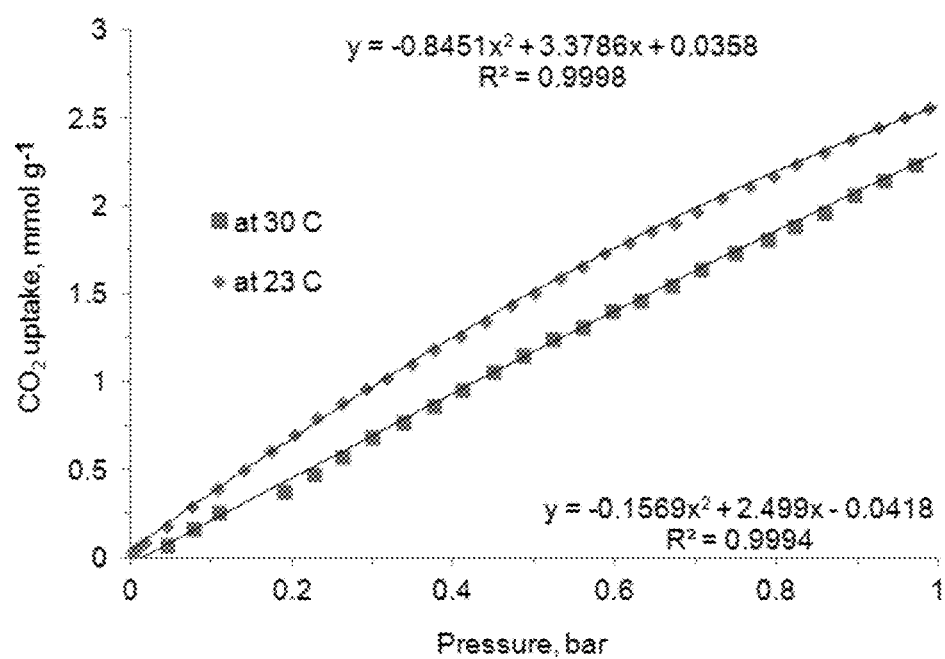
FIG. 16 shows low pressure $CO_2$ uptake of uGil-900 at 23° C. and 30° C. These measurements were performed using a volumetric gas uptake apparatus.
Figure 17:
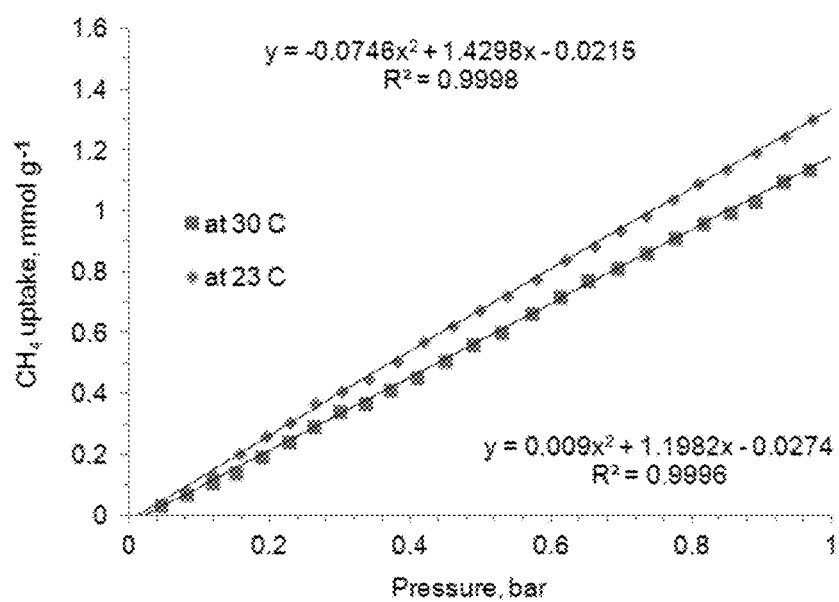
FIG. 17 shows low pressure $CH_4$ uptake of uGil-900 at 23° C. and 30° C. These measurements were performed using a volumetric gas uptake apparatus.

The surface interactions of uGil-900 with $CO_2$ and $CH_4$ were investigated by analysis of isosteric heats of absorptions ($Q_{st}$) estimated using virial method (FIG. 15). The isosteric heat of absorptions ($Q_{st}$) of $CO_2$ and $CH_4$ on the surface of uGil-900 was calculated using low pressure $CO_2$ and $CH_4$ sorption isotherms at 23° C. and 30° C., as shown in FIGS. 16-17. The $Q_{st}$ value of $CH_4$ was found to be 25 kJ mol$^{-1}$ and gradually decreased to ~12 kJ mol$^{-1}$ during the filling of the pores. This suggests the stronger affinity of $CH_4$ with the micropore surface of uGil-900 at low pressures, which is slowly dominated by $CH_4$—$CH_4$ interactions at higher pressures as the pores begin to fill, ultimately reaching the liquefaction enthalpy of methane (8.2 kJ mol$^{-1}$). The observed $Q_{st}$ value at initial loading (25 kJ mol$^{-1}$) for uGil-900 is slightly higher than the reported values for porous carbon materials, which could be ascribed to its narrow pore sizes and high micropore volume.

For $CO_2$, which has a larger quadrupole moment (13.4 C m$^2$) than does the $CH_4$ (nonpolar), the $Q_{st}$ starts at much higher value (50 kJ mol$^{-1}$ at initial gas loading) and drops to 21 kJ mol$^{-1}$ as surface binding sites become less accessible and $CO_2$—$CO_2$ interactions become more important. The enthalpy of liquefaction of $CO_2$ is 17.2 kJ mol$^{-1}$. The higher $Q_{st}$ values for $CO_2$ than for $CH_4$ indicate overall stronger gas-surface and gas-gas interaction for $CO_2$ at low and high pressures.

In order to attain quantitative insight into the nature of gas-surface and gas-gas interactions within the pores of uGil-900 at higher pressures, Applicants conducted dual ($CO_2$ and $CH_4$) absorption measurements at high pressures. Displacement of $CH_4$ by $CO_2$ from the $CH_4$ preadsorbed uGil-900 at various pressures was monitored as a function of time, enabling extraction of kinetic parameters.

Figure 18A:
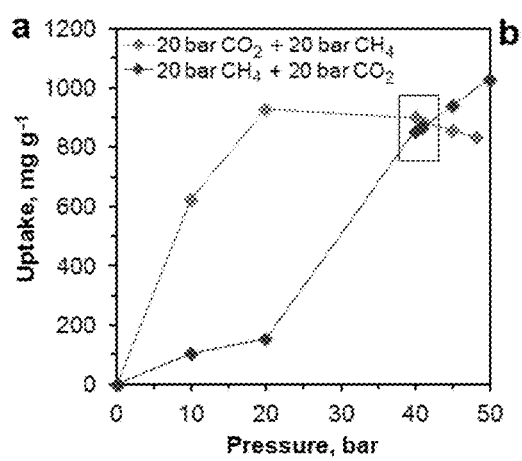
FIG. 18A shows the adsorption isotherms of gas mixing ($CO_2$ and $CH_4$) on the uGil-900 at a total pressure of 40 bar (20 bar $CO_2$+20 bar $CH_4$) at 25° C. Each data point is recorded for 2 hours.
Figure 18B:
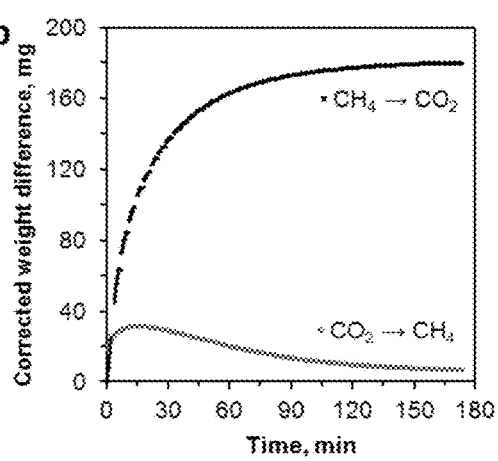
FIG. 18B shows the kinetics of relative weight change of the $CH_4$ (black) and $CO_2$ (red) pressurized uGil-900 at 20 bar during mixing with additional $CO_2$ (black) and $CH_4$ (red) at 20 bar (red) at 25° C. The graphs show total mixing pressures. These measurements were performed using a gravimetric gas uptake apparatus.

FIG. 18 shows representative measurements describing multicomponent ($CO_2$ and $CH_4$) adsorptions on uGil-900 at 25° C. In FIG. 18A (shown in red), preadsorbed uGil-900 with 20 bar $CO_2$ is subjected to the addition of another 20 bar $CH_4$. The system is then permitted to equilibrate, during which the relative weight change of the total gas mass is monitored (FIG. 18B, in red).

When an additional 30 bar of $CH_4$ is added, the further gravimetric uptake on the carbon was minimal (FIG. 18A).

Therefore, the majority of the sorption sites on uGil-900 were already occupied by the $CO_2$. However, when the preadsorbed uGil-900 with 20 bar of $CH_4$ is subjected to another 20 bar of $CO_2$, and the system is permitted to equilibrate, rapid gravimetric uptake can be observed (FIG. 18A, in blue and FIG. 18B in black), suggesting that the initial $CH_4$ binding sites were replaced by the newly adsorbed $CO_2$.

Kinetics of the gas displacement were conducted in a Rubotherm magnetic suspension balance at 25° C. by sequential dosing of gases at various pressures and recording of weight change over time (FIG. 18B). The rate constant of the $CH_4$ displacement by coadsorbed $CO_2$ ($k_{CO2}$) was estimated from the positive slope of the kinetics curve (FIG. 18B, black). The rate constants of the $CO_2$ displacement by $CH_4$ ($k_{CH4}$) was estimated from the negative slopes of the kinetics curve (FIG. 18B, red), since the displacement of $CO_2$ by coadsorbed $CH_4$ resulted in a decrease of the overall mass of the gas-adsorbed porous material.

Figure 19:
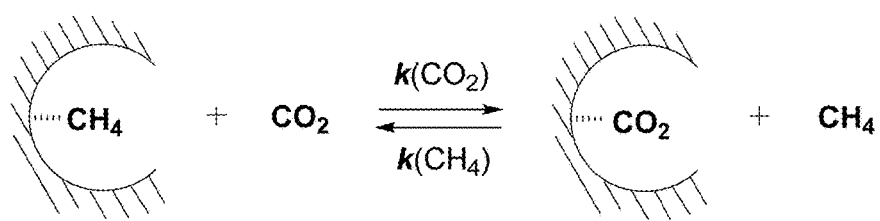
FIG. 19 shows a schematic illustration of $CO_2$ versus $CH_4$ displacement.
Figure 20A:
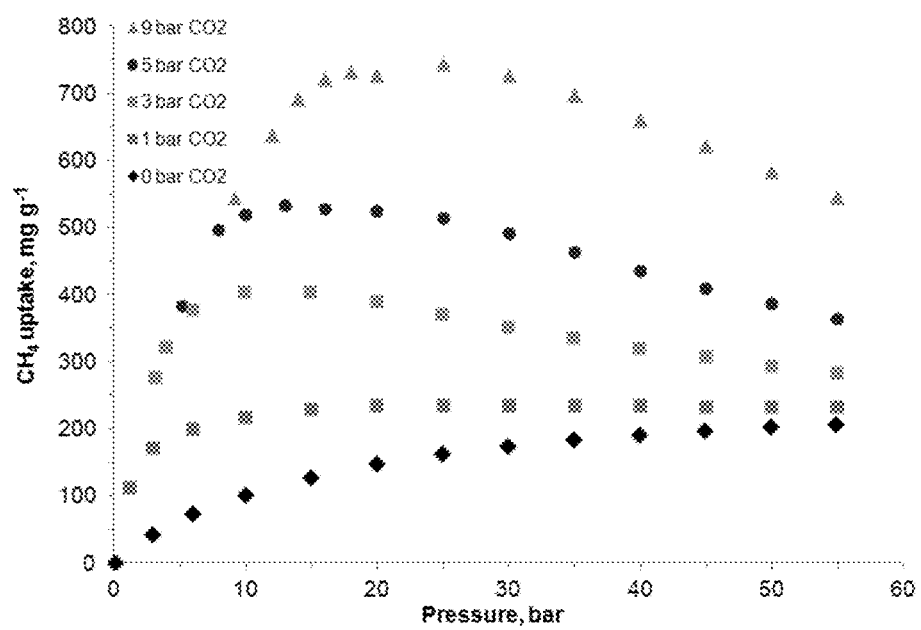
FIG. 20A shows gravimetric excess $CH_4$ uptake of uGil-900 as a function of $CO_2$ presence.
Figure 20B:
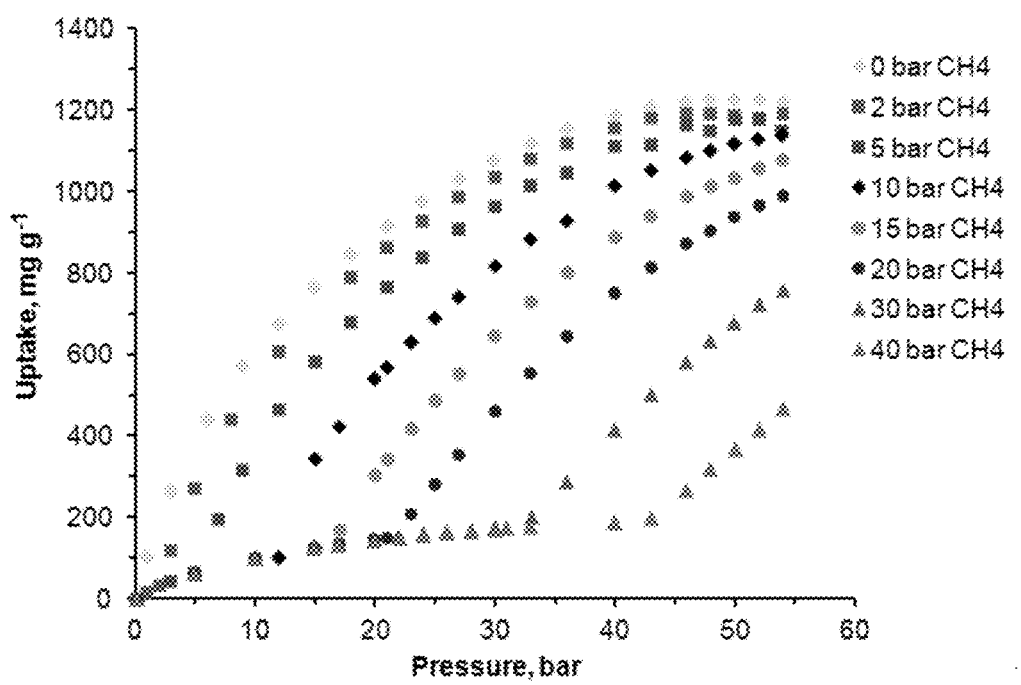
FIG. 20B shows gravimetric excess $CO_2$ uptake of uGil-900 as a function of $CH_4$ presence. These measurements were performed using a gravimetric gas uptake apparatus.
Figure 21A:
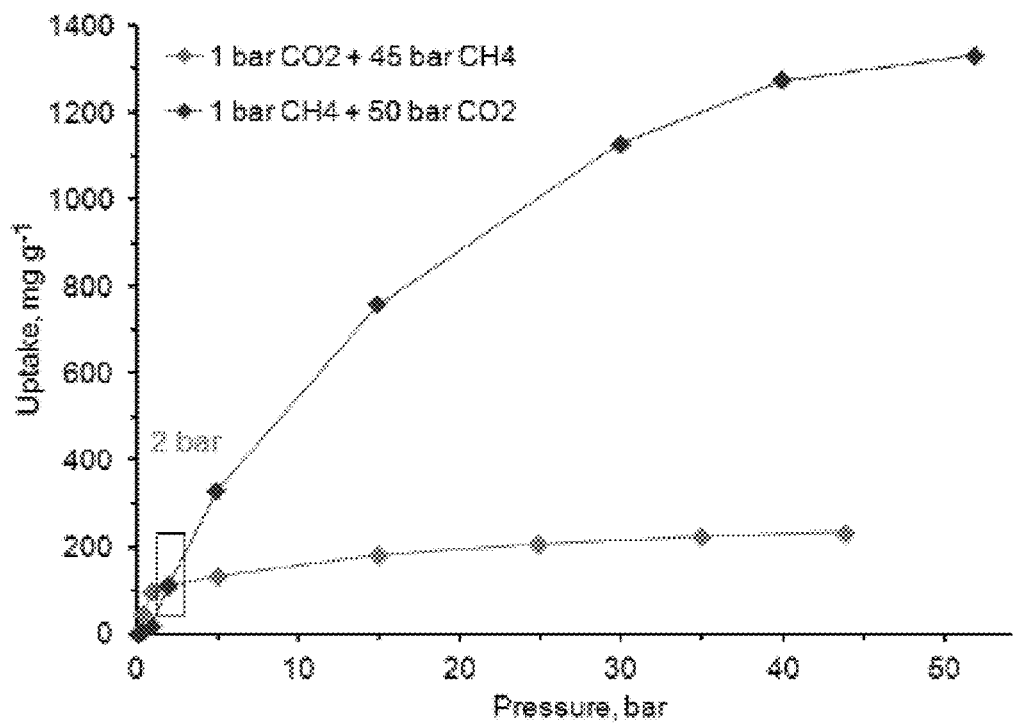
FIG. 21 shows the adsorption isotherms of gas mixing ($CO_2$ and $CH_4$) on the uGil-900 at a total of 2 bar (1 bar $CO_2$+1 bar $CH_4$) (FIG. 21A), 10 bar (5 bar $CO_2$+5 bar $CH_4$) (FIG. 21B), 20 bar (10 bar $CO_2$+10 bar $CH_4$) (FIG. 21C), and 40 bar (20 bar $CO_2$+20 bar $CH_4$) (FIG. 21D) at 25° C. These measurements were performed using a gravimetric gas uptake apparatus.
Figure 21B:
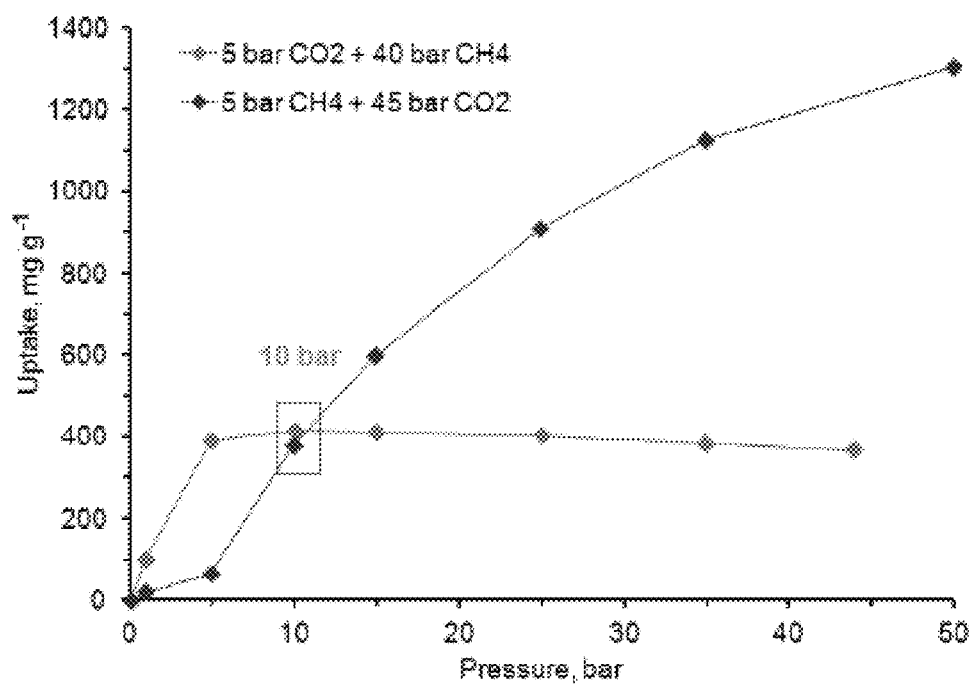
Figure 21C:
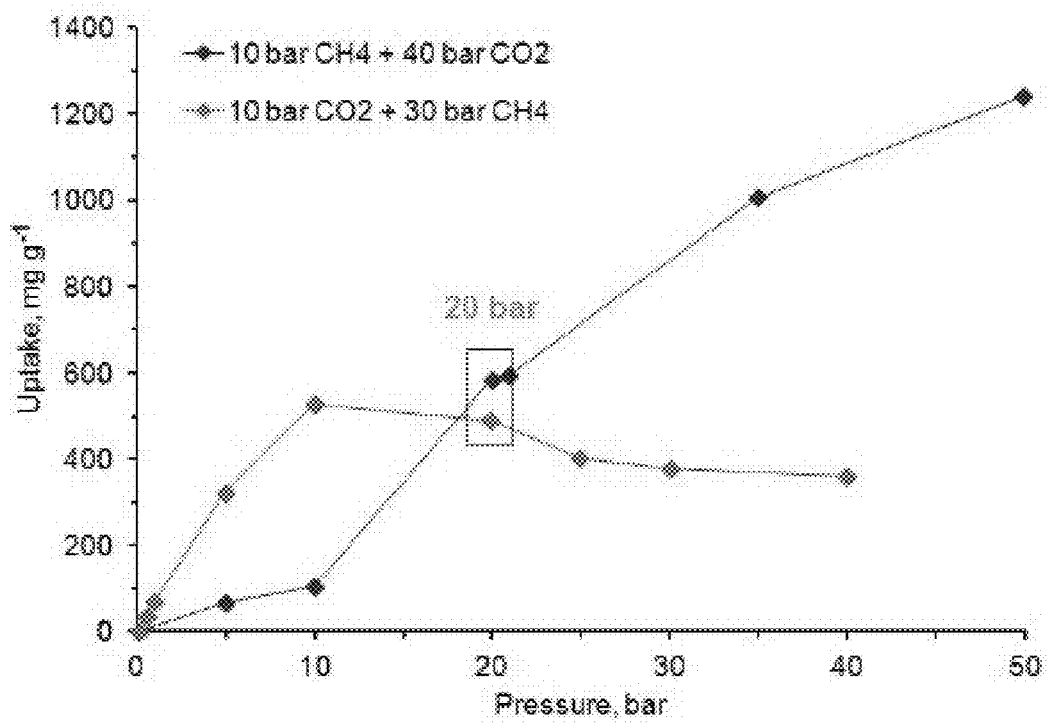
Figure 21D:
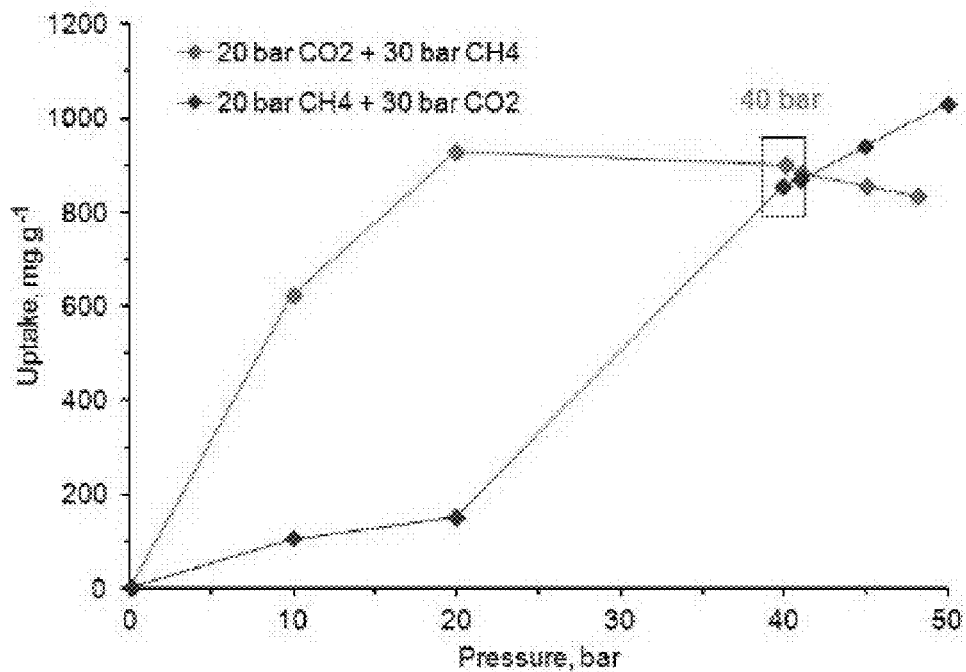
Figure 22A:
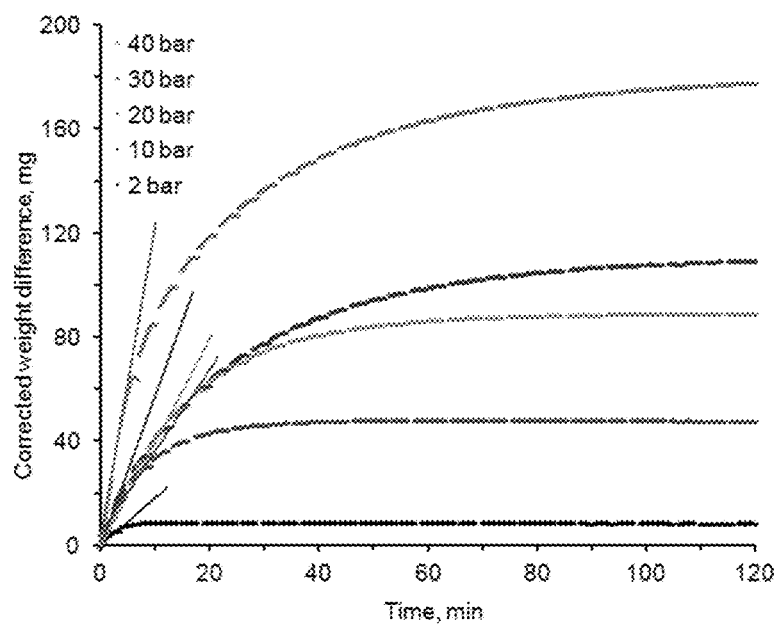
FIG. 22 shows the relative weight change of the $CH_4$ (FIG. 22A) and $CO_2$ (FIG. 22B) pressurized uGil-900 at 1 bar (black), 5 bar (purple), 10 bar (green), 15 bar (blue), and 20 bar (red) during the mixing with additional $CO_2$ (FIG. 22A) and $CH_4$ (FIG. 22B) at 1 bar (black), 5 bar (purple), 10 bar (green), 15 bar (blue), and 20 bar (red) at 25° C. The graphs show total mixing pressures. These measurements were performed using a gravimetric gas uptake apparatus.
Figure 22B:
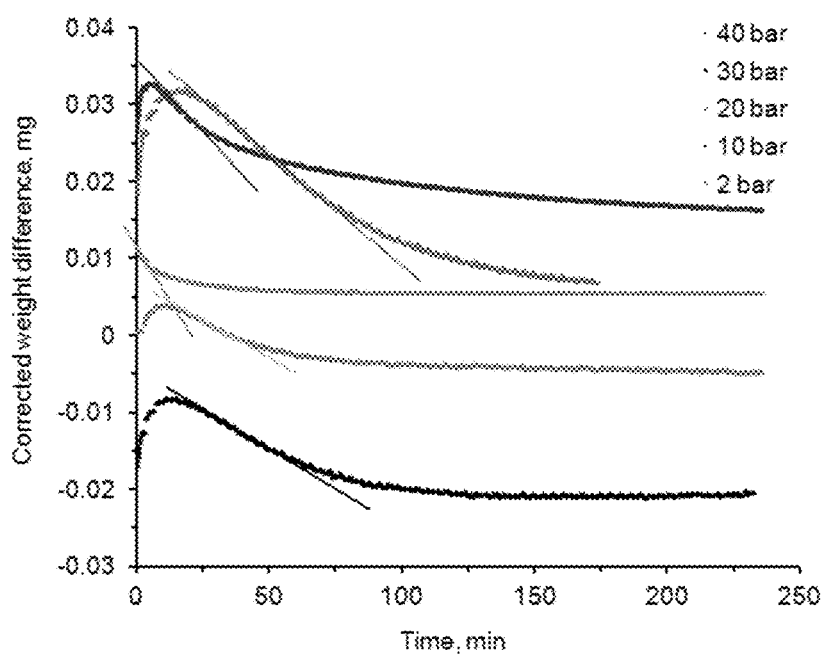

FIG. 19 illustrates the equilibrium of the competitive adsorption of $CO_2$ and $CH_4$. In the case of gas mixings ($CO_2$ vs $CH_4$), competitive adsorption proceeds at the same sites within the pores. However, as a result of differences in electronic structures, such as polarizability of $CO_2$ versus $CH_4$, $CO_2$ can interact more efficiently with the polar surface functional groups such as C—OH, C=O, or C—O—C (FIG. 6D) of the porous carbon. These measurements were repeated at pressure ranges of 2 to 40 bar (FIGS. 20-22) and the rate constants for gas displacement were extracted (Table 4). The displacement constant ($D_{CO2}$) defined as the ratio of $k_{CO2}/k_{CH4}$ was shown to increase with the total pressure.

TABLE 4

Rate constants and displacement constants of competitive adsorptions $CH_4$ vs $CO_2$ for uGil-900 at 25° C.

| Total Pressure, bar | k(CH$_4$→CO$_2$), mg/min | k(CH$_2$→CH$_4$), mg/min | $D_{CO2}$ | k(CH$_4$→CO$_2$), mmol/min | k(CH$_2$→CH$_4$), mmol/min | $D_{CO2}$ (molar) |
|---|---|---|---|---|---|---|
| 2  | 3.0  | 0.5 | 6    | 0.068 | 0.031 | 2.2  |
| 10 | 4.3  | 0.3 | 14.3 | 0.098 | 0.019 | 5.2  |
| 20 | 5.0  | 0.2 | 25   | 0.114 | 0.013 | 8.8  |
| 30 | 6.5  | 0.2 | 32.5 | 0.148 | 0.013 | 11.4 |
| 40 | 13.0 | 0.2 | 65   | 0.296 | 0.013 | 22.8 |

Figure 23:
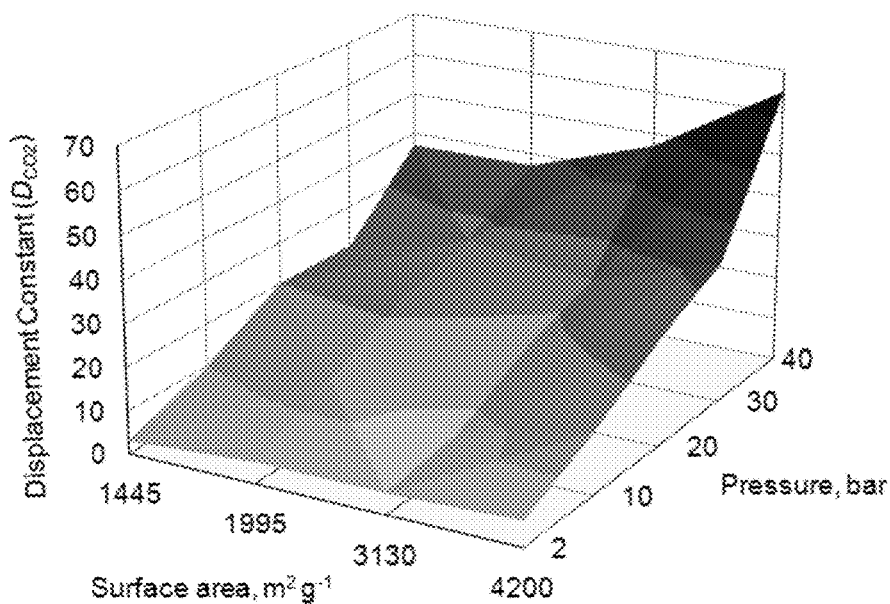
FIG. 23 shows the three-dimensional $CO_2/CH_4$ displacement surface of the various porous carbon materials commercial activated carbon (Darco G-60, $S_{BET}$=1445 m$^2$ g$^{-1}$), biochar derived activated carbons (B-PC-1995, $S_{BET}$=1995 m$^2$ g$^{-1}$; and B-PC-3130, $S_{BET}$=3130 m$^2$ g$^{-1}$), and uGil-900. The measurements were performed using a gravimetric gas uptake apparatus.

The effect of surface area on the $D_{CO2}$ was analyzed by comparing the gas displacement measurements on porous carbons with different surface areas (FIG. 23). Although there are small differences in $D_{CO2}$ at lower pressures (<20 bar) between porous carbons with surface areas that range from 1500 to 4200 m$^2$ g$^{-1}$, uGil-900 shows the highest $D_{CO2}$ at high pressure. In addition, uGil-900 with the highest $D_{CO2}$ displacement constant can provide efficient selectivity of $CO_2$ over $CH_4$. While Applicants investigated competitive adsorption of a 1:1 mixture of $CO_2$ and $CH_4$, displacement constants may also depend on the relative partial pressures of the components in the mixture.

In summary, Applicants have demonstrated in this Example the preparation of ultra-high surface area porous carbon materials from readily available asphalt. This provides an inexpensive carbon source that rivals some MOFs in surface area and selectivity. The pretreatment step removes more volatile compounds, providing higher molecular weight asphaltene aggregates that serve as templates for further carbonization. The uGil-900, with its surface area of 4200 m$^2$ g$^{-1}$, has attained among the highest surface areas of the porous carbonaceous materials recorded to date, even though it is made directly from an inexpensive asphalt carbon source.

Competitive adsorptions of $CO_2$ and $CH_4$ on the synthesized porous carbon materials were tested by analysis of the kinetics measurements of the successive gas displacement steps. Investigations of kinetics of the gas displacement show the increase in $D_{CO2}$ with pressure. $D_{CO2}$ reaches to 65 at 40 bar. These observations indicate that the porous materials from asphalt are promising inexpensive sorbents for industrial applications where $CO_2$ needs to be removed from natural gas streams.

Example 1.4. Materials

Versatrol H T, Versatrol M, Asphasol Supreme and Natural asphalt from Chile were provided by MI SWACO, a Schlumberger Company. Untreated Gilsonite and untreated Gilsonite Substitute were provided by Prince Energy. Activated carbon Darco G-60 and all other chemicals were purchased from Sigma-Aldrich and used without further purification unless otherwise stated.

Example 1.5. Synthesis of Asphalt Derived Porous Carbon (uGil-T)

1.50 g of asphalt (untreated Gilsonite) was heated on a ceramic boat inserted within a quartz tube furnace at 400° C. for 2 hours with Ar flow at 500 sccm, 1 atm, before being permitted to cool to room temperature to form 0.50 g of pretreated untreated Gilsonite (uGil-P). 0.25 g of uGil-P and 1.00 g (17.9 mmol) of KOH were ground well in a mortar. The mixture was heated on a quartz boat inserted within a quartz tube furnace at 600° C., 700° C., 800° C. or 900° C. for 20 minutes with Ar flow at 500 sccm (1 atm), before being permitted to cool to room temperature.

The product was washed thoroughly with DI water and acetone until the filtrate attained a pH of 7 to yield uGil-600, uGil-700, uGil-800 and uGil-900, respectively. The uGil-T powder was dried in an oven at 100° C. until a constant weight was achieved to afford 0.10-0.15 g of porous carbon materials. Under comparable conditions, different types of asphalt were screened: natural asphalt from Chile, Versatrol M, Asphasol Supreme, untreated Gilsonite and untreated Gilsonite Substitute.

Example 1.6. Volumetric Gas Sorption

Volumetric sorption measurements of $CO_2$ or $CH_4$ (or premixed gases) were carried out in an automated Sievert instrument (Setaram PCTPro). Typically, ~120 mg of sorbent was placed in a stainless steel sample cell and pretreated at 150° C. for 2 hours under vacuum (~20 mTorr). The sample volume was calibrated by helium before the sorption measurement.

Example 1.7. Gravimetric Sorption

Gravimetric sorption measurements of $CO_2$ were carried out in a Rubotherm magnetic suspension balance (Rubotherm, Germany). A blank test without sample was used to measure the weight and volume of the empty sample holder. For a typical measurement, about 120 mg of sorbent was placed in the sample holder and pretreated at 150° C. for 2 hours under vacuum (~20 mTorr). A buoyancy test with helium was then used to measure the sample weight and sample volume before the sorption measurement. Kinetics of the gas displacement were conducted at 25° C. by subsequent dosing of gases at various pressures. The weight change was recorded over time.

Example 1.8. Characterization

The XPS were obtained on a PHI Quantera SXM scanning X-ray microprobe system using a 100 μm X-ray beam of which the take-off angle was 45° and pass energy was 140 eV for the survey and 26 eV for the high resolution elemental analysis. The surface areas, pore volumes and pore size distributions (Barrett, Joyner, and Halenda-BJH) of different samples were obtained using an automated BET surface analyzer (Quantachrome Autosorb-3b). The samples were heated at 150° C. for 15 hours under vacuum (20 mTorr) before each measurement.

TGA was performed on a TGA Q50 instrument (TA Instruments) at a heating rate of 10° C./min under argon atmosphere, from room temperature to 800° C. The experiments were carried out under an air atmosphere at a flow rate of 50 mL/min.

SEM images were taken at 20 KeV in a FEI Quanta 400 high resolution field emission scanning electron microscope. HRTEM images were obtained in a 2100F field emission gun transmission electron microscope. The porous carbon samples were transferred to a C-flat TEM grid (Protochips). Xray diffractograms of powder samples mounted on a grooved zero background holder were acquired with a Rigaku D/Max Ultima II Powder X-ray diffractometer equipped with a Cu Kα radiation source ($\lambda$=1.5418 Å) and JADE 2009 software. Raman spectral plots of powder samples placed on a glass slide were acquired with a Renishaw inVia Raman microscope equipped with 514 nm Ar ion laser and WiRe software.

Example 1.9. Synthesis of Biochar Derived Porous Carbon (B-PC-1995)

About 0.50 g of CoolTerra biochar, 0.25 g melamine, and 2.5 g of KOH were well-mixed using a mortar and pestle, and the solid was heated from room temperature to 800° C. at a rate of 25° C. per minute in a tube furnace under an Ar flow rate of 500 sccm at 1 atm. The intermediate was then activated by holding at 800° C. at 1 atm under 500 sccm Ar for 45 minutes before being allowed to cool to room temperature. The solid product was then washed with 200 mL of DI water (3×) and dried at 120° C. for 12 hours to yield 0.15 g of the sample.

Example 1.10. Synthesis of Biochar Derived Porous Carbon (B-Pc-3130)

About 0.50 g of mesquite biochar (pyrolyzed at 450° C.), 0.25 g melamine, and 3.0 g of KOH were well-mixed using a mortar and pestle. The solid was heated from room temperature to 800° C. at a rate of 25° C. per minute in a tube furnace under an Ar flow rate of 500 sccm at 1 atm. The intermediate was then activated by holding at 800° C. at 1 atm under 500 sccm Ar for 45 minutes before being allowed to cool to room temperature. The solid product was then washed with 200 mL of DI water (3×) and dried at 120° C. for 12 hours to yield 0.20 g of the sample.

Example 2. Water in Carbon for $CO_2$ Capture and Separation

In this Example, Applicants show that water ($H_2O$) could be imbibed into uGil-900 to generate a $H_2O$ to carbon weight ratio of approximately 1.5:1 in the final powder material. The hydrated uGil-900 showed a high $CO_2$ uptake capacity of 48 mmol g$^{-1}$ (211 wt %) relative to the amount of carbon. Moreover, the selectivity of the carbon material for $CO_2$ over $CH_4$ (i.e., the molar ratio of the absorbed $CO_2$ and $CH_4$ ($V_{CO_2}/V_{CH_4}$)) increased to more than 200:1. In addition, the $H_2O$ molecules remained within the pores upon repeated cycling.

In situ surface infrared (IR) spectroscopy revealed the formation of $CO_2$ hydrates at the inflection point of the $CO_2$ sorption isotherm. In addition, the $CO_2$-captured uGil-900 revealed the formation of an ordered matrix within the pores consisting of $CO_2$-hydrates. Within the micropores of the porous carbon, the $H_2O:CO_2$ molar ratio reached a record value of 1.8, which shows a far greater $CO_2$ in $H_2O$ capacity than ordinarily seen in $CO_2$-hydrate formations.

Figure 24A:
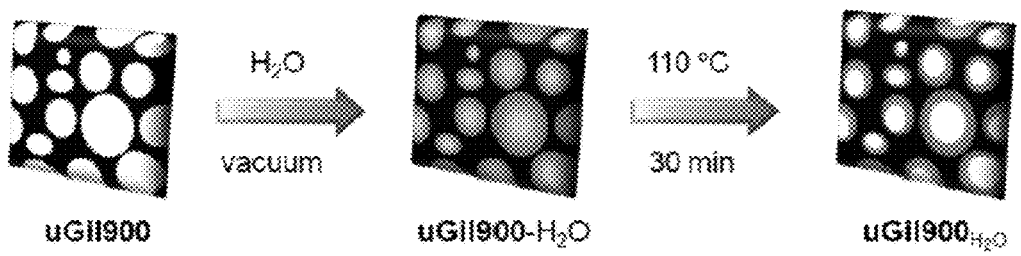
FIG. 24A provides a scheme for the preparation of uGil-900$_{H2O}$.

The uGil-900 was prepared from asphalt by using a two-step process described in Example 1. FIG. 24A shows a schematic representation for preparation of water imbibed uGil-900, where 200 mg of dry uGil-900 is submersed in 5 mL of deionized water under an applied vacuum of 10 torr for 30 minutes. Water imbibed uGil-900 (uGil-900-$H_2O$) is obtained as a black solid.

Figure 24B:
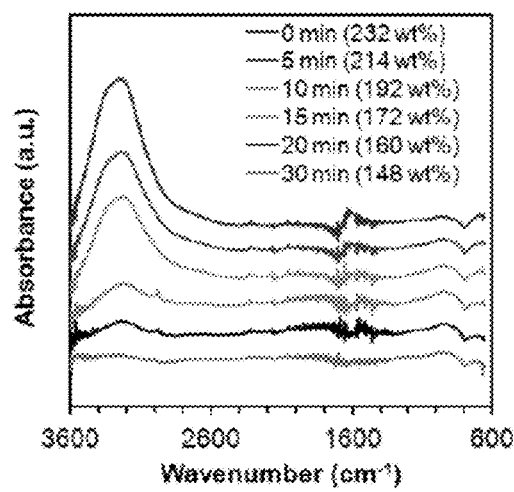
FIG. 24B shows an attenuated total reflectance infrared (ATR-IR) absorption spectra of water absorbed uGil-900 as a function of drying time at 110° C.

After filtration under vacuum at 30 torr, uGil-900-$H_2O$ contains 230 wt % of water, though the powder surface appears dry. The attenuated total reflectance infrared (ATR-IR) spectrum (FIG. 24B) shows the large water signature at about 3300 cm$^{-1}$.

Drying uGil-900-$H_2O$ at 110° C. and atmospheric pressure for 30 minutes removes residual water from the surface of the porous materials to yield solid uGil-900$_{H_2O}$ with a water to carbon ratio of 1.48 (148 wt %). As shown from the ATR-IR spectra (FIG. 24B), uGil-900$_{H_2O}$ does not contain water vibrational signals, suggesting that remaining water molecules embedded within the pores of the material cannot be reached by the IR beam.

Figure 24C:
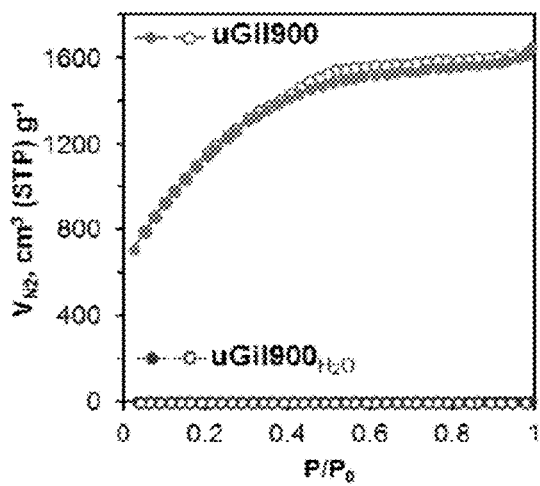
FIG. 24C provides a comparison of nitrogen sorption isotherms for uGil-900 and uGil-900$_{H_2O}$ at 77 K. Also shown are pore size distributions of uGil900$_{H_2O}$ estimated using NLDFT from $N_2$ sorption isotherms (FIG. 24D) and the cumulative pore volume of uGil900$_{H_2O}$ estimated using NLDFT (FIG. 24E).
Figure 24D:
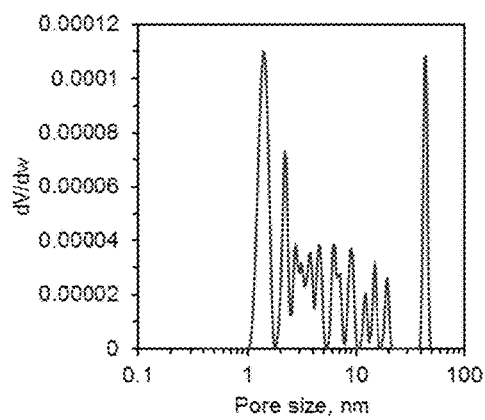
FIG. 24 provides illustrations and data relating to the preparation and characterization of hydrated uGil-900 (uGil-900$_{H2O}$).
Figure 24E:
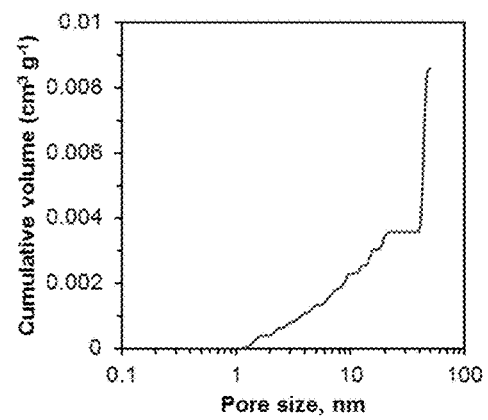

Further structural characterization of uGil-900$_{H_2O}$ was performed using nitrogen ($N_2$) sorption measurements to determine the surface area (FIG. 24C). The $N_2$ sorption isotherm reveals a type III isotherm typical for macroporous materials in comparison to type IV isotherm for uGil-900. Upon water incorporation, the surface area decreased from 4200 m$^2$ g$^{-1}$ to 7 m$^2$ g$^{-1}$. Thus, the micro- and mesopores are occupied by water molecules. Also shown are pore size distributions of uGil900$_{H_2O}$ estimated using NLDFT from $N_2$ sorption isotherms (FIG. 24D) and cumulative pore volume estimated using NLDFT (FIG. 24E).

Figure 25:
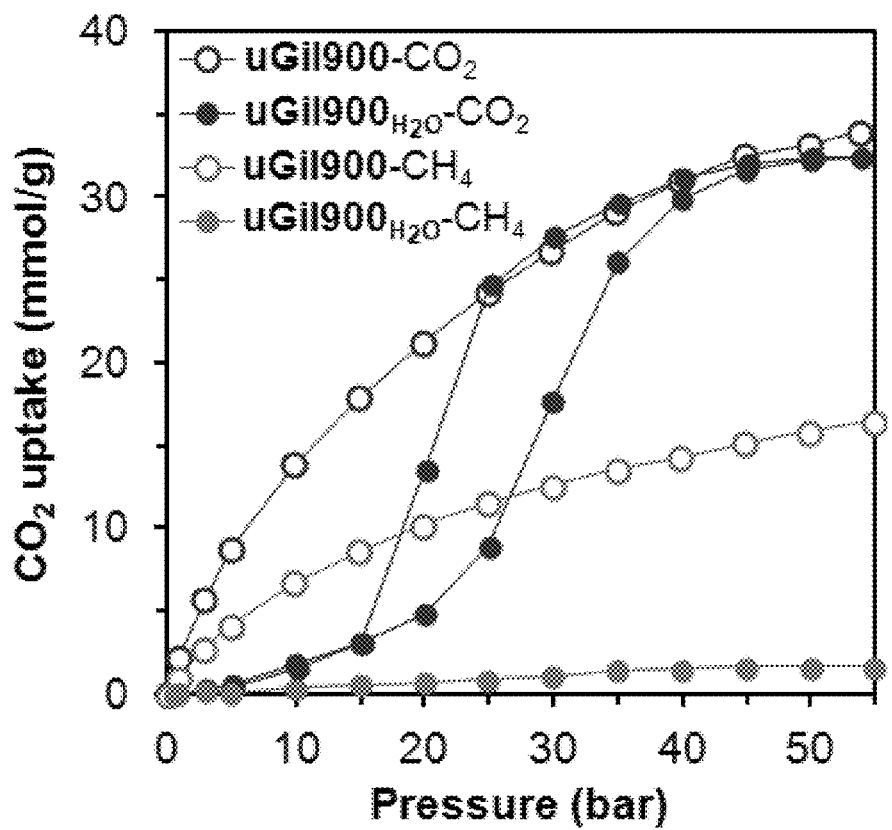
FIG. 25 provides a comparison of the $CO_2$ (blue) and $CH_4$ (red) sorption isotherms for uGil-900 and uGil-900$_{H_2O}$ at 25° C. These measurements were performed using a gravimetric gas uptake apparatus.

The gravimetric $CO_2$ and $CH_4$ sorption isotherms for uGil-900 and uGil-900$_{H_2O}$ at 25° C. and 0 to 54 bar pressure range are shown in FIG. 25. The uGil-900 displays typical isotherms for porous carbon materials, while the isotherm for uGil-900$_{H_2O}$ shows S-shaped $CO_2$ sorption isotherm with very little uptake at pressures up to 20 bar. However, at 20 to 40 bar, the uptake drastically increases from 4.6 to 30 mmol g$^{-1}$ (here uptake capacities are defined as uptake with respect to the mass of the carbon). This is in contrast to the CH$_4$ uptake isotherm for uGil-900$_{H_2O}$, which shows only a small gradual uptake of 1.8 mmol g$^{-1}$ at 54 bar. As a result, the CO$_2$/CH$_4$ selectivity for uGil-900$_{H_2O}$ can reach up to 30 at 35 bar and 25° C.

Another important feature of uGil-900$_{H_2O}$ is the hysteretic behavior of the CO$_2$ sorption isotherm, which on desorption rejoins the sorption isotherm at 15 bar, with the complete release of the CO$_2$ close to 1 bar. Complete release of CO$_2$ molecules can be associated with weak sorbent-sorbate interactions typical for physisorption, as opposed to chemisorptions where irreversible uptake of gas molecules can take place.

Figure 26A:
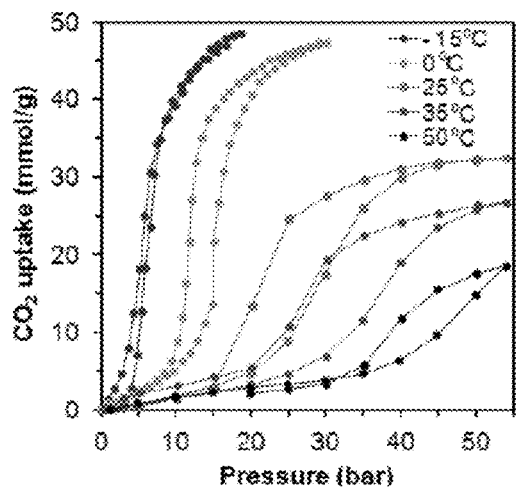
FIG. 26A shows temperature dependent $CO_2$ sorption isotherm on uGil-900$_{H_2O}$ using 20 minute dosing equilibrium time.

FIG. 26A shows the CO$_2$ sorption isotherms at varying temperatures. The temperature dependent changes in the isotherm occurs in two ways. First, as the temperature goes down, the pressure at the steeply rising portion of the isotherm decreases from about 40 bar to about 4 bar as temperature decreases from 50° C. to −15° C. Second, the total CO$_2$ uptake capacity increases up from 18 mmol g$^{-1}$ to 48 mmol g$^{-1}$ as the temperature decreases from 50° C. to −15° C.

From the uptake isotherm at 50° C., it is evident that the saturation point has not been fully reached at 54 bar (FIG. 26A). Two distinct differences in the total CO$_2$ uptake capacities could be identified in FIGS. 26A and 26B. First, there is a high temperature (≥25° C.) uptake region with ~30 mmol g$^{-1}$ and a low temperature (<0° C.) uptake region with ~48 mmol g$^{-1}$, which correspond to the molar ratio of H$_2$O/CO$_2$ of 2.8 (CO$_2$×(H$_2$O)$_{2.8}$) at high temperature, and 1.8 (CO$_2$×(H$_2$O)$_{1.8}$) at low temperature. These values are much lower than values for CO$_2$ hydrate formations in pure water, which has a molar ratio of H$_2$O/CO$_2$ of 5.75.

The width of the hysteresis curve decreases with temperature, reaching a nearly hysteresis-free CO$_2$ sorption isotherm at −15° C. This also suggest that the low temperature CO$_2$-hydrate, CO$_2$×(H$_2$O)$_{1.8}$, is less thermodynamically stable than the high temperature structure, CO$_2$×(H$_2$O)$_{2.8}$.

CO$_2$ uptake at lower pressures and disappearing of the hysteresis loop upon decreasing water content. Stability of uGil-900$_{H_2O}$ was tested by recording multiple CO$_2$ sorption-desorption cycles at 0 and 25° C. (FIG. 26D). Although the shape of the isotherm changes slightly over the cycling period, almost negligible degradation of the uGil-900$_{H_2O}$ is observed during the cycling processes, with loss of water content being less than 1%. In the actual natural gas stream which contains 1-3% water, such loss will likely be unobservable.

Because of the limiting low temperature window for running measurements on gravimetric apparatus and the limiting pressure window for CO$_2$ uptake on volumetric apparatus, the CO$_2$ measurements that were performed at ≥25° C. were done using a gravimetric gas uptake apparatus and those that were performed at <25° C. were done using a volumetric gas uptake apparatus. FIG. 26E shows that there is little difference between the volumetric (Setaram) and gravimetric (Rubotherm) gas uptake measurements for CO$_2$ sorption on uGil900$_{H_2O}$ at 25° C.

The significance of the CO$_2$-hydrate formations within the micropores was investigated for their effect in the selectivity of CO$_2$ uptake over CH$_4$ at relevant pressures and temperatures. Table 5 and FIG. 27 summarize the CO$_2$ and CH$_4$ uptake performance of uGil-900$_{H_2O}$ at various pressures and temperatures.

Figure 27A:
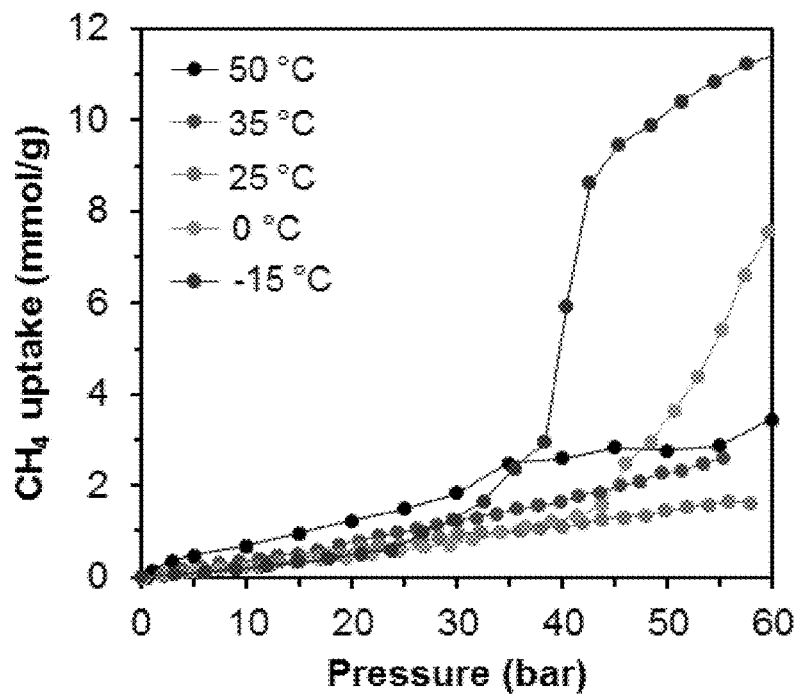
FIG. 27A shows a temperature dependent $CH_4$ sorption isotherm on uGil-900$_{H_2O}$ using a 20 minute dosing equilibrium time.

Unlike CO$_2$ sorptions, uGil-900$_{H_2O}$ does not show any sign of hydrate formations with CH$_4$ below 50 bar and above 0° C. (FIG. 27A). Only at −15° C. and above 40 bar it is possible to see a steeply rising isotherm, indicating the possible formation of CH$_4$-hydrates at higher pressures. Below 40 bar, the CH$_4$ uptakes are generally low and decrease with temperature, which makes a significant contribution to selectivity of CO$_2$ uptakes over CH$_4$ (Table 5).

As a result, the selectivity can reach the ultra-high value of 210 for uGil900$_{H_2O}$ at 7 bar and −15° C. Such a high selectivity is a consequence of the strong CO$_2$-hydrate formation within the pores, which changes the mechanism of the sorption from physisorption for uGil900 to weak chemisorption for uGil900$_{H_2O}$.

TABLE 5

Figure 27B:
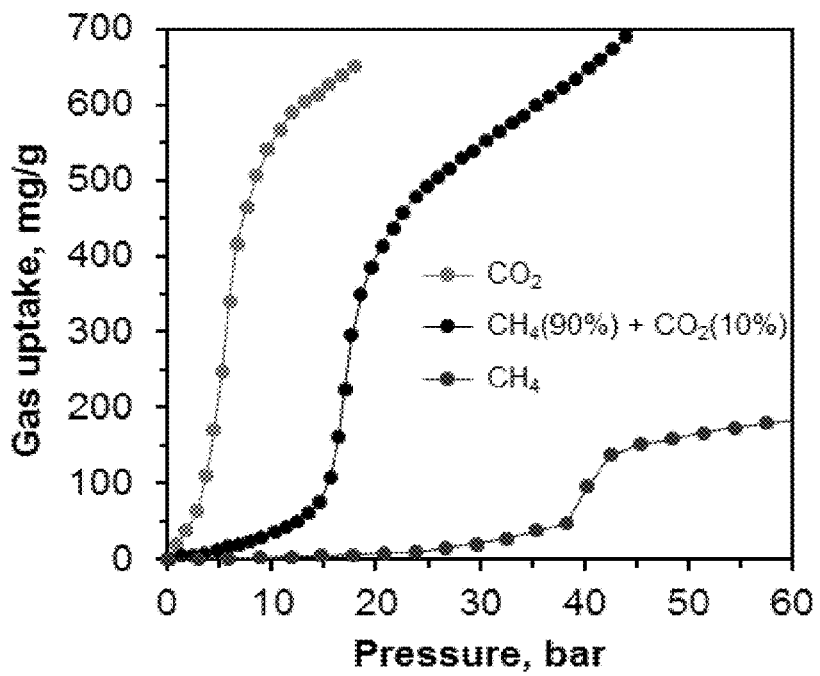
FIG. 27B shows selective $CO_2$ uptake of uGil900$_{H_2O}$ from 90% $CH_4$ and 10% $CO_2$ gas mixture. Also shown is a comparison of the $CO_2$ (red) and $CH_4$ (blue) with the premixed gas sorption isotherms for uGil900$_{H_2O}$ at −15° C. These measurements were performed using a volumetric gas uptake apparatus. Also shown are additional temperature dependent isotherms on uGil-900$_{H_2O}$ for $CO_2$ sorption (FIG. 27C) and $CH_4$ sorption (FIG. 27D).
Figure 27C:
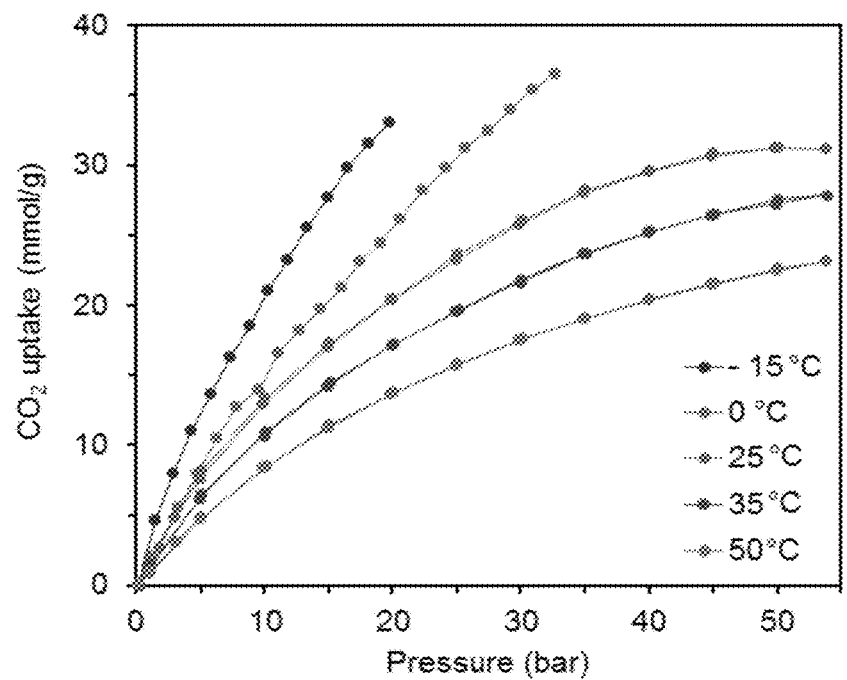
FIG. 27 shows data relating to the uptake of $CH_4$ and $CO_2$ by uGil-900$_{H_2O}$.
Figure 27D:
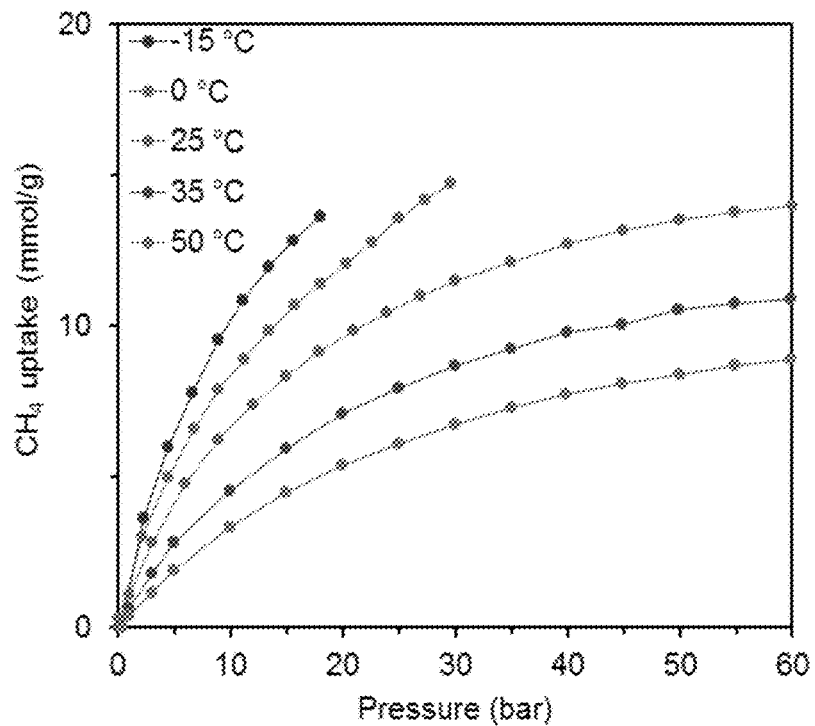

Comparison of the CO$_2$ and CH$_4$ uptakes and selectivities of uGil-900 and uGil-900$_{H_2O}$. FIGS. 27C-D show the isotherms and testing details.

| | CO$_2$ uptake (mmol/g) | | | | | CH$_4$ uptake (mmol/g) | | | | | CO$_2$/CH$_4$ selectivity* | | | | |
|---|---|---|---|---|---|---|---|---|---|---|---|---|---|---|---|
| Temp (° C.) | −15 | 0 | 25 | 35 | 50 | −15 | 0 | 25 | 35 | 50 | −15 | 0 | 25 | 35 | 50 |
| Pressure (bar) | 7 | 20 | 35 | 45 | 50 | 7 | 20 | 35 | 45 | 50 | 7 | 20 | 35 | 45 | 50 |
| uGil-900 | 15 | 25 | 30 | 26 | 23 | 7.3 | 12 | 12 | 10 | 8.4 | 2.1 | 2.1 | 2.5 | 2.6 | 2.7 |
| uGil-900$_{H_2O}$ | 42 | 45 | 30 | 26 | 18 | 0.2 | 0.4 | 1.0 | 1.9 | 2.8 | 210 | 110 | 30 | 13 | 6 |

*Selectivity - defined as the molar ratio of CO$_2$ to CH$_4$ uptakes

Figure 26B:
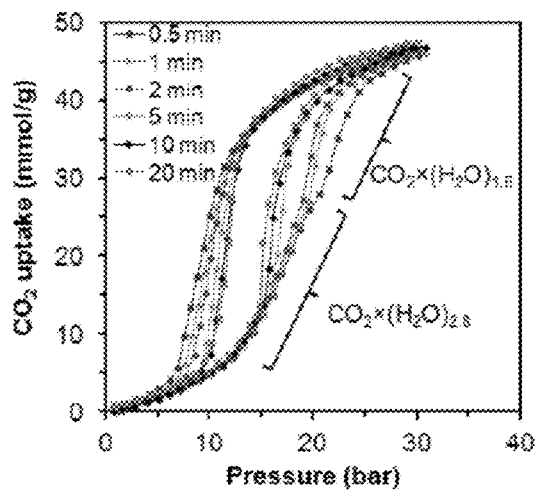
FIG. 26B shows $CO_2$ sorption isotherms at 0° C. using dosing equilibrium time varying from 0.5 minutes to 20 minutes, and two distinct phases of $CO_2$-hydrates shown in the inset.

FIG. 26B shows the CO$_2$ sorption isotherms recorded at 0° C. with differing dosing equilibration times of 0.5 to 20 minutes. There is a decrease of the width of the hysteresis loop as the equilibration time increases. Faster equilibration time (starting from 5 down to 0.5 minutes) shows two distinct uptake regions (i.e., less than 20 bar and more than 20 bar) (FIG. 26B). Based on the analysis of temperature dependent isotherms, Applicants assign these two phases to the high temperature phase of CO$_2$×(H$_2$O)$_{2.8}$ at less than 20 bar and the low temperature phase of CO$_2$×(H$_2$O)$_{1.8}$ at more than 20 bar (FIG. 26B).

Figure 26C:
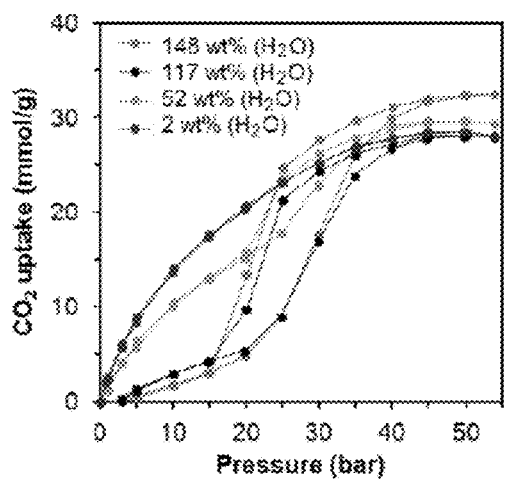
FIG. 26C shows $CO_2$ sorption isotherms with different water content at 25° C., using 20 minute dosing equilibrium time.
Figure 26D:
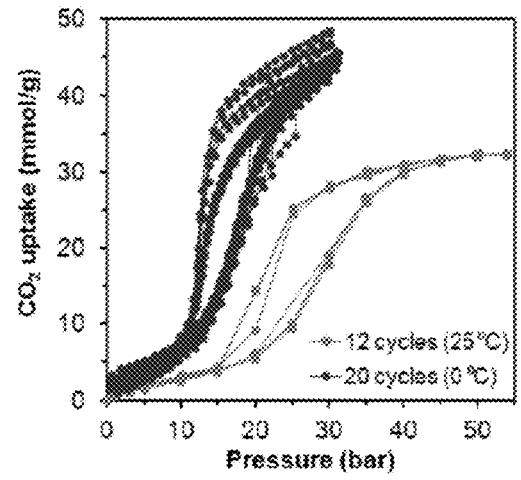
FIG. 26D shows 20 and 12 cycles of $CO_2$ uptake with uGil-900$_{H_2O}$ at 0 and 25° C., respectively.
Figure 26E:
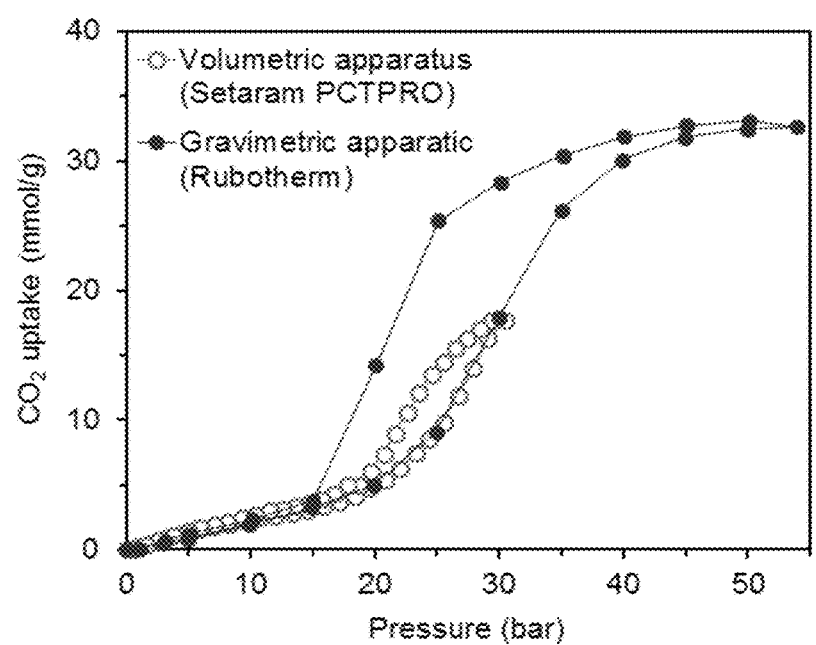
FIG. 26E summarizes further details on testing methods.

CO$_2$ uptake isotherms were also recorded as a function of water content (FIG. 26C), which resulted in increasing of To represent the realistic situation of the natural gas wells, where a CO$_2$ concentration might be as high as 10%, Applicants tested the performance of uGil900$_{H_2O}$ on sorption of premixed gas with concentration of 90% CH$_4$ and 10% CO$_2$. As shown in FIG. 27B, at −15° C. the sorption isotherm of the premixed gas reveal steeply rising gas uptake at 15 bar, considerably higher pressure than for pure CO$_2$ uptake. However, much lower pressure was observed for pure CH$_4$ uptake (FIG. 27B). Moreover, the total gas uptake by weight (~700 mg g$^{-1}$) is much higher compared to the pure CH$_4$ uptake of 200 mg g$^{-1}$ and close to the value of pure CO$_2$ uptake of 650 mg g$^{-1}$ (FIG. 27B). These measurements show that uGil900$_{H_2O}$ can selectively separate CO$_2$ from the premixed gas at 15 bar and −15° C.

The temperature-dependent excess $CO_2$ sorption isotherms on uGil900 using a 20 minute dosing equilibrium time are shown in FIG. 27C. The temperature-dependent excess $CH_4$ sorption isotherms on uGil900 using a 20 minute dosing equilibrium time are shown in FIG. 27D. Because of the limiting low temperature window for running measurements on gravimetric apparatus and the limiting pressure window for $CO_2$ uptake on volumetric apparatus, the measurements that were performed at ≥25° C. were done using a gravimetric gas uptake apparatus and those that were performed at <25° C. were done using a volumetric gas uptake apparatus.

$CH_4$ uptakes are generally low and decrease with temperature, which makes significant contribution to selectivity of $CO_2$ uptakes over $CH_4$ (Table 5). As a result, the selectivity can reach the high value of 210 for uGil-900$_{H_2O}$ at 7 bar and −15° C. Such a high selectivity is a consequence of the strong $CO_2$-hydrate formation within the pores, which changes the nature of the sorption from the physical adsorption for uGil-900 to weak chemical absorption for uGil-900$_{H_2O}$.

Figure 28:
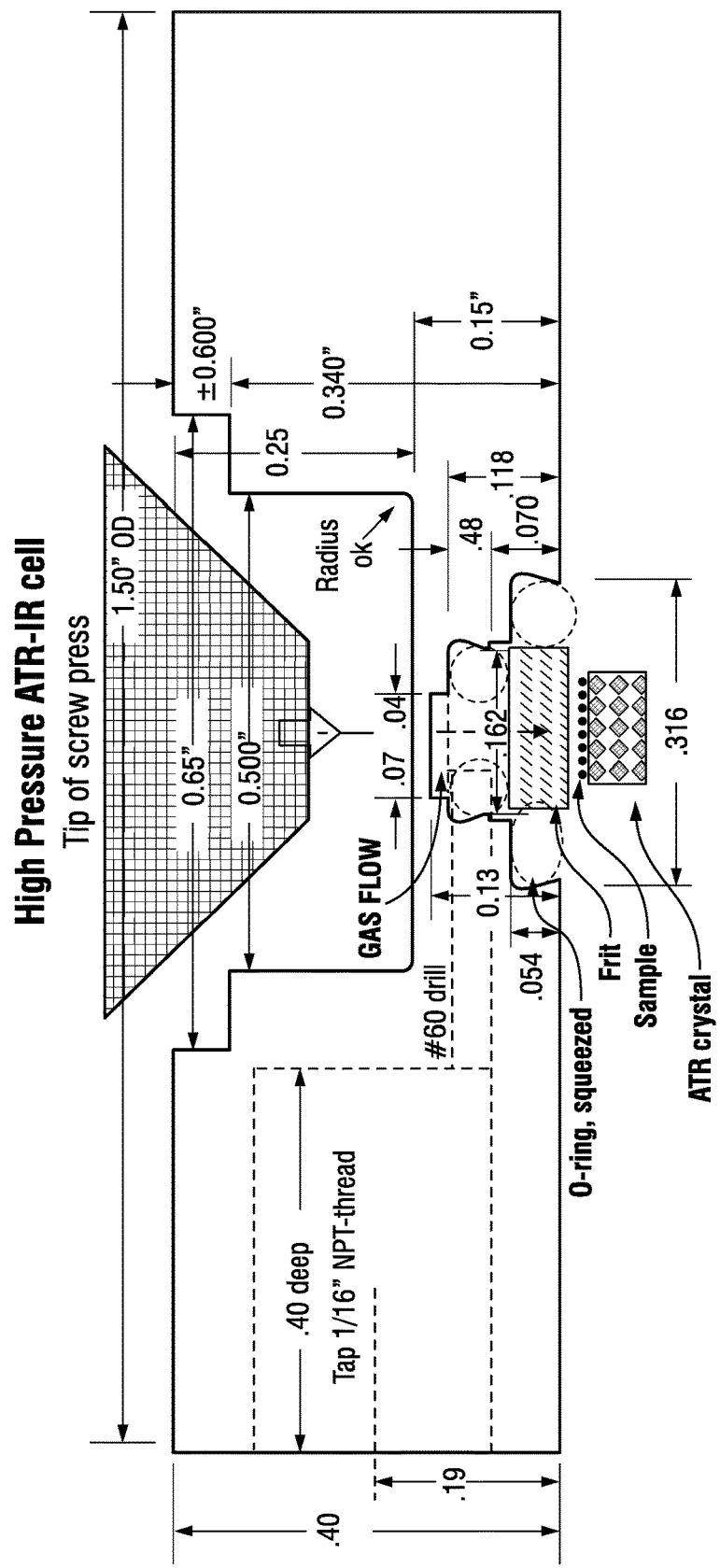
FIG. 28 shows the design of a high pressure ATR-IR cell.
Figure 29:
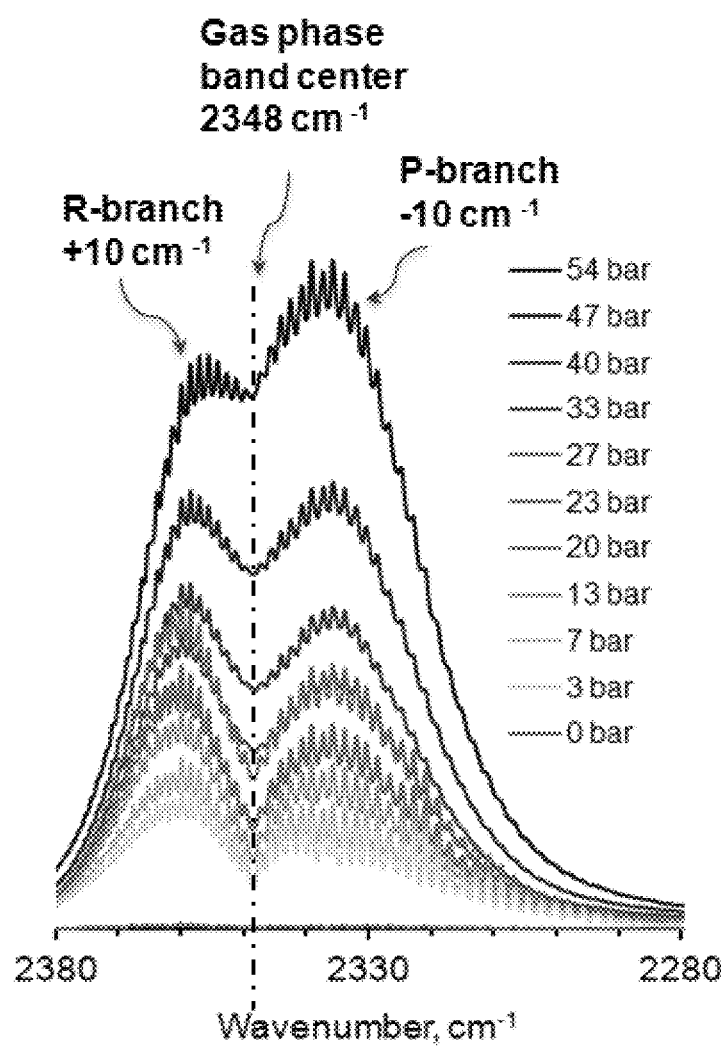
FIG. 29 shows the in-situ ATR-IR spectra of gaseous $CO_2$ at different pressures and at 25° C. The R-branch shows the proportion of $CO_2$ in the gas phase. The frequency is unchanged at 54 bar maximum pressure.
Figure 30:
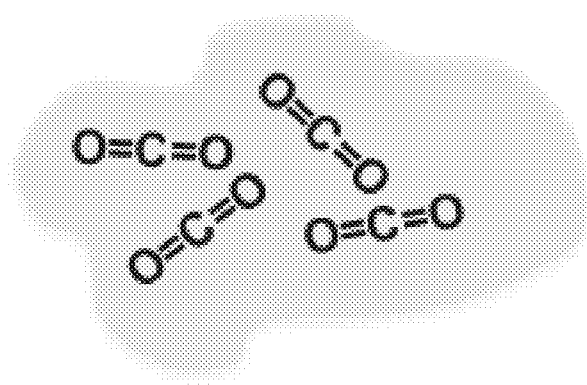
FIG. 30 shows a schematic representation of gas phase $CO_2$.

In order to better assess the nature of the $CO_2$ uptake on the uGil-900 and uGil-900$_{H_2O}$, Applicants further investigated the $CO_2$ sorption using in situ ATR-IR spectroscopy. ATR-IR spectroscopy reflects the pressure dependent changes in the vibrational modes of $CO_2$ and $H_2O$ and provides the detailed information on the gas-solid or gas-liquid-solid interactions. In the "empty" cell of a high pressure ATR-IR cell (FIG. 28), the gaseous $CO_2$ has typical rotational bands at 2358 cm$^{-1}$ ($\Delta$ J=+1, R-branch, higher frequency) and 2338 cm$^{-1}$ ($\Delta$ J=−1, P-branch, lower frequency) (FIG. 29). The missing band ($\Delta$J=0, Q-branch, center frequency) is a narrow dip in between (FIG. 29), which is the vibrational frequency of the gaseous $CO_2$ absorption band at 2348 cm$^{-1}$ (antisymmetric stretch). As the pressure increases, the intensity of the peaks increases linearly with pressure, indicating the gas phase $CO_2$ at maximum pressure of 54 bar (FIGS. 29-30).

Figure 31:
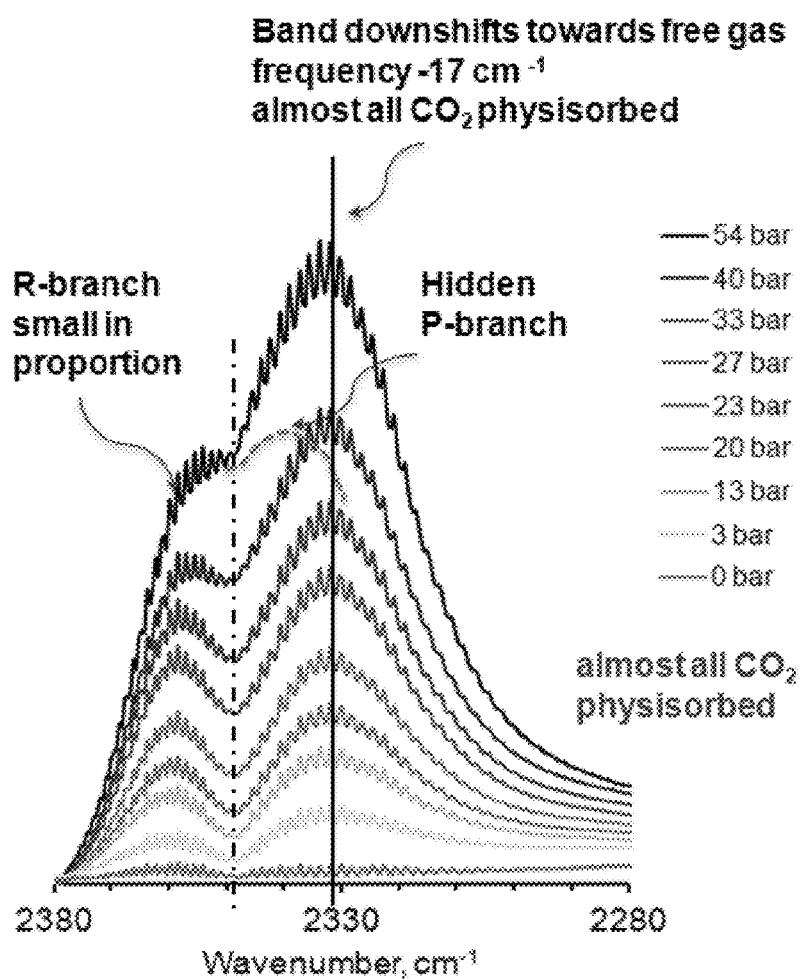
FIG. 31 shows an analysis of the in-situ ATR-IR spectra of adsorbed $CO_2$ on uGil-900 at 25° C. A frequency downshift (−) is observed from a gas phase antisymmetric stretch band center of $CO_2$ (~2348 cm$^{-1}$).
Figure 32:
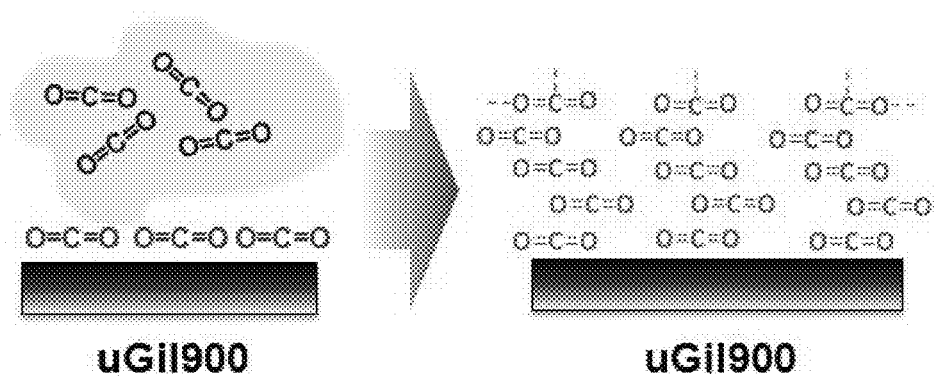
FIG. 32 shows a schematic representation of adsorbed gas phase $CO_2$ on uGil-900 upon increasing pressure to 54 bar and at 25° C.

When the cell is filled with the uGil-900 at a vapor pressure of 54 bar, the peak is twice as stronger in intensity than the empty cell, and the absorption frequency is downshifted about 7 cm$^{-1}$ when compared to $CO_2$ in the gas phase (FIG. 31). This is due to the weakening of the O=C=O bonds and the slowing of the rotational motion for the $CO_2$. The observed spectrum is a sum from the gas phase and physisorbed $CO_2$ (Eq. 1), which results in an increase of the intensity of the lower frequency peak compared to the gas phase spectra (FIGS. 31-32).

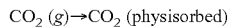

$$CO_2\ (g) \rightarrow CO_2\ (\text{physisorbed}) \qquad \text{Eq. 1}$$

Figure 33:
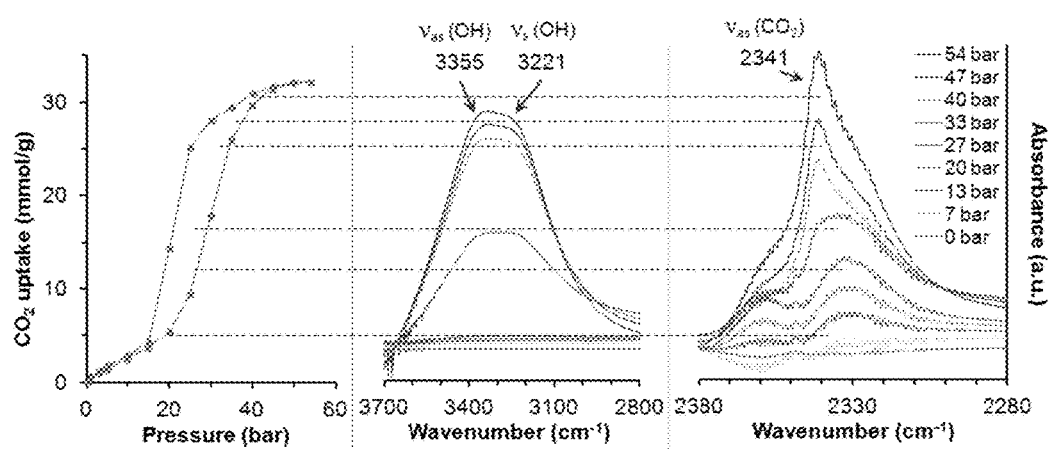
FIG. 33 shows an ATR-IR absorption spectra of uGil-900$_{H_2O}$ as a function of $CO_2$ pressure at 25° C.

FIG. 33 illustrates changes in the IR peaks with increasing $CO_2$ pressure on uGil-900$_{H2O}$. The uGil-900$_{H_2O}$ demonstrate a rapid increase in the upshifted peak at 2341 cm$^{-1}$ with a pressure of $CO_2$ at room temperature (FIG. 33). An approximate measure of peak heights showed this enhanced adsorption to be about two times larger compared to uGil-900 and four times larger compared to an "empty" cell.

The $CO_2$ uptake isotherm for the uGil-900$_{H_2O}$ has similar dependence with both the $H_2O$ and $CO_2$ IR-peak intensities, which increase with pressure (FIG. 33). At low pressure (<20 bar), the $CO_2$ peak center is downshifted to 2331 cm$^{-1}$. This suggests that the physisorption of $CO_2$ on uGil-900$_{H_2O}$ is taking place at lower pressures, the similar behavior observed with uGil-900. Upon increasing the pressure (>20 bar), the $CO_2$ peak gradually upshifts in frequency to 2341 cm$^{-1}$ (+3 cm$^{-1}$ compared to $CO_2$ in the gas phase). Such results suggest a different mechanism of $CO_2$ sorption at higher pressures. Furthermore, the changes in the intensity of the $CO_2$ peak at 2341 cm$^{-1}$ followed by the changes in the $H_2O$ absorption bands at 3221 cm$^{-1}$ and 3355 cm$^{-1}$ change with pressure.

It is evident that the steeply rising isotherm of the $CO_2$ uptake (>20 bar, FIG. 33) together with the formation of the new $CO_2$ peak at 2341 cm$^{-1}$ and the rapid increase in $H_2O$ peaks suggest the formation of weakly chemisorbed $CO_2$-hydrates that can be reversibly generated within the micropores of uGil-900$_{H_2O}$. The frequency of the antisymmetric stretch of the $CO_2$ molecules in the $CO_2$-hydrate cages has been reported previously (2347 cm$^{-1}$ and 2337 cm$^{-1}$), and the values compare closely to 2341 cm$^{-1}$. Upshifted frequency and the increase in the intensity of the $CO_2$ peak indicate a weakening of the O=C=O bond, which is also commensurate with the marked ~10× enhancement of $CO_2$ uptake on uGil-900$_{H_2O}$ (FIG. 33). Applicants envision that such observations are the result of a pronounced increase in $H_2O$—$CO_2$ interactions and formation of $CO_2$-hydrates.

Figure 34:
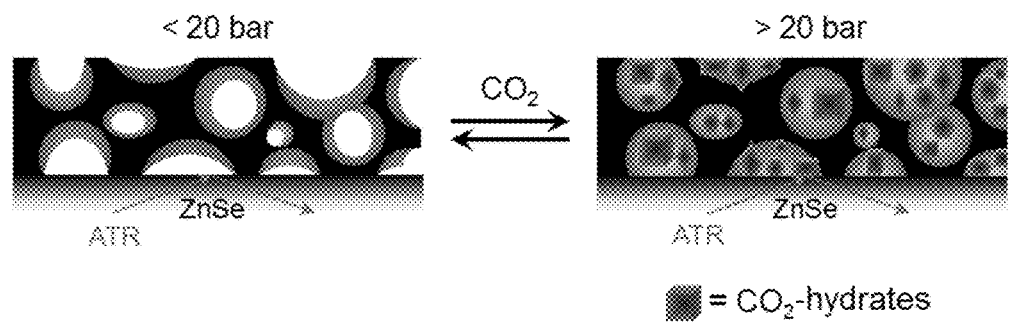
FIG. 34 shows a schematic illustration of $CO_2$-hydrate formations upon $CO_2$ sorption on uGil-900$_{H_2O}$.

Another feature of gas-hydrates is the dynamic behavior of crystal growth, which often results in expansion. The uGil-900$_{H_2O}$ presents a distinct $CO_2$ uptake behavior, which can be monitored in situ. FIG. 34 provides a representative illustration of the cross-sectional side views of the pores of uGil-900$_{H_2O}$ in the presence of water and applied IR beam, which are shown at two equilibrium conditions (<20 bar, before steeply rising a portion of the $CO_2$ uptake isotherm, and >20 bar, after a rapid increase in the $CO_2$ uptake). Below 20 bar, uGil-900$_{H_2O}$ shows little $CO_2$ uptake and neither $H_2O$ nor $CO_2$-hydrate peaks can be observed in the ATR-IR spectra. Upon increasing the pressure above 20 bar, all three features are readily observed, as a result of expanded $CO_2$-hydrates that can be reached by the IR beam. Consequently, both the sudden appearance of the $H_2O$ and $CO_2$-hydrate peaks above 20 bar are most likely causing molecule-molecule interactions to become stronger than molecule-surface interactions (FIG. 34).

In summary, Applicants have shown that selective $CO_2$ capture over $CH_4$ can be achieved using hydrated porous carbon materials. The selectivity and the $CO_2$ uptake capacity reaches record high values of 210 and 48 mmol g$^{-1}$ at −15° C., respectively. It was observed that $CO_2$ sorption exhibits an equilibrium behavior. Moreover, the kinetics of gas sorption-desorption processes suggest physisorption of $CO_2$, which is promising for use in pressure swing adsorption. In situ IR spectroscopic measurements suggest the formation of $CO_2$ hydrates at the inflection point of the $CO_2$ sorption isotherm.

Example 2.1. Materials

Untreated Gilsonite was provided by Prince Energy. All other materials were purchased from Sigma-Aldrich and used without further purification unless otherwise stated.

Example 2.2. Sample Preparation

About 200 mg of uGil-900 was suspended with 5 ml of nanopure water loaded in a 20 ml vial, which was then put in a container under vacuum at 100 mTorr for 1 hour until the bubbles stopped appearing. During this process, water entered the pores of uGil-900. Thereafter, the solid carbon material was filtered under vacuum to yield wet uGil-900-$H_2O$ with a water to carbon weight ratio of 2.32. Next, uGil-900$_{H2O}$ was dried at 110° C. for 30 minutes to form a uGil-900$_{H2O}$ with a water to carbon weight ratio of 1.48.

Example 2.3. Volumetric Gas Sorption

Volumetric sorption measurements of $CO_2$ or $CH_4$ (or premixed gases) were carried out in an automated Sievert instrument (Setaram PCTPro). Typically, about 120 mg of sorbent was placed in a stainless steel sample cell and pretreated at 150° C. for 2 hours under vacuum (~20 mTorr). The sample volume was calibrated by helium before the sorption measurement.

Example 2.4. Gravimetric Gas Sorption

Gravimetric sorption measurements of $CO_2$ were carried out in a Rubotherm magnetic suspension balance (Rubotherm, Germany). A blank test without sample was used to measure the weight and volume of the empty sample holder. For a typical measurement, ~120 mg of sorbent was placed in the sample holder and pretreated at 150° C. for 2 hours under vacuum (~20 mTorr). A buoyancy test with helium was then used to measure the sample weight and sample volume before the sorption measurement. Kinetics of the gas displacement were conducted at 25° C. by subsequent dosing of gases at various pressures and recording the weight change over time.

Example 2.5. Characterization

The XPS were obtained on a PHI Quantera SXM scanning X-ray microprobe system using a 100 μm X-ray beam of which the take-off angle was 45° and pass energy was 140 eV for the survey and 26 eV for the high resolution elemental analysis. The surface areas, pore volumes and pore size distributions (Barrett, Joyner, and Halenda-BJH) of different samples were obtained using an automated BET surface analyzer (Quantachrome Autosorb-3b). The samples were heated at 150° C. for 15 hours under vacuum (20 mTorr) before each measurement.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of capturing $CO_2$ from an environment, the method comprising:
   hydrating a porous material with water molecules to the extent thereby to define a preselected region of a plurality of hydrated pores and yet to the extent to allow the preselected region of a plurality of pores of the porous material to uptake gas molecules;
   positioning the porous material within a $CO_2$ associated environment; and
   capturing $CO_2$ by the hydrated porous material,
   wherein the capturing results in the capture of unhydrated $CO_2$ and $CO_2$-hydrates within the pores of the porous material, and
   wherein the $CO_2.nH_2O$ ratio within the pores of the porous material is n<4.

2. The method of claim 1, wherein the porous material comprises a plurality of nucleophilic moieties.

3. The method of claim 1, wherein the hydrating step comprises imbibing a plurality of pores of a predefined region of the porous material with water molecules.

4. The method of claim 1, wherein prior to the step of hydrating the porous material, pore volume of the porous material comprises at least 0.5 cm$^3$/g to thereby define a pre-hydrated pore volume, and wherein after the step of hydrating the porous material, the pore volume of the hydrated porous material comprises less than 90% of the pre-hydrated pore volume thereby to provide unsaturated pores of the porous material and enhanced for selective uptake of the $CO_2$ in the $CO_2$ associated environment.

5. The method of claim 4, further comprising reducing saturation of the pores to a value less than 100%.

6. The method of claim 5, wherein the pore volume of the hydrated porous material comprises between 90% and 20% of the pre-hydrated pore volume to provide unhydrated pore volume within the porous material for enhanced selective uptake of $CO_2$ in the $CO_2$ associated environment.

7. The method of claim 4, further comprising the step of determining pore volume by porosimetry measurements.

8. The method of claim 1, further comprising forming one or more ordered matrices within the pores, the one or more ordered matrices comprising $CO_2$-hydrates.

9. The method of claim 3, wherein the water molecules comprise a form of gas hydrates positioned within the plurality of pores.

10. The method of claim 3, wherein the water molecules are associated with water soluble additives.

11. The method of claim 10, wherein the water soluble additives are selected from the group consisting of salts, bases, organic solvents, organic amines, fluorocarbons, small molecules, oligomers, polymers, and combinations thereof.

12. The method of claim 1, wherein the porous material has a $CO_2$ capture capacity of about 100% to about 250% of the porous material weight.

13. The method of claim 1, wherein the molar ratio of captured $CO_2$ over captured hydrocarbon in porous material ranges from 10 to about 250.

14. The method of claim 1, wherein the molar ratio of captured $CO_2$ over captured hydrocarbons in the porous carbon material is more than 200.

15. The method of claim 1, wherein the porous material is selected from the groups consisting of porous organic frameworks, metal-organic frameworks, zeolites, molecular sieves, porous carbon materials, and combinations thereof.

16. The method of claim 1, wherein the porous material is a porous carbon material.

17. The method of claim 1, wherein $CO_2$ associated environment comprises a natural gas stream that also contains water vapor.

18. The method of claim 1, wherein the capture of $CO_2$ by the hydrated pores of the porous material occurs selectively over hydrocarbons in the environment.

19. The method of claim 1, further comprising a step of releasing the captured $CO_2$ from the porous material thereby to maintain hydration within the porous material.

20. The method of claim 19, further comprising a step of reusing the plurality of hydrated pores of the porous material after the releasing to capture additional $CO_2$ from an environment.

21. The method of claim 1, wherein the porous material comprises a mixture of micropores and mesopores.

22. The method of claim 1, wherein the capturing results in the reversible capture of $CO_2$.

* * * * *